US010699706B1

(12) United States Patent
Jayavel et al.

(10) Patent No.: US 10,699,706 B1
(45) Date of Patent: Jun. 30, 2020

(54) SYSTEMS AND METHODS FOR DEVICE COMMUNICATIONS

(71) Applicant: Amazon Technologies, Inc., Seattle, WA (US)

(72) Inventors: Vishnu Jayavel, Chennai (IN); Ilana Rozanes, Cambridge, MA (US); John Baker, Kirkland, WA (US); Ryan Andrew Lathan, Seattle, WA (US); Bradley Lyman, Seattle, WA (US); Michael Richard Baglole, Seattle, WA (US); Katherine Ann Baker, Kirkland, WA (US); Aparna Nandyal, Tamil Nadu (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 43 days.

(21) Appl. No.: 15/716,326

(22) Filed: Sep. 26, 2017

(51) Int. Cl.
*G10L 15/22* (2006.01)
*G10L 13/08* (2013.01)
*G10L 15/18* (2013.01)
*H04L 29/08* (2006.01)

(52) U.S. Cl.
CPC .............. *G10L 15/22* (2013.01); *G10L 13/08* (2013.01); *G10L 15/1822* (2013.01); *H04L 67/18* (2013.01)

(58) Field of Classification Search
None
See application file for complete search history.

(56) References Cited

U.S. PATENT DOCUMENTS

| 6,757,362 | B1 * | 6/2004 | Cooper | H04M 3/527 |
| | | | | 379/88.01 |
| 2005/0033582 | A1 * | 2/2005 | Gadd | G06Q 30/02 |
| | | | | 704/277 |
| 2014/0025738 | A1 * | 1/2014 | Anand | H04W 4/21 |
| | | | | 709/204 |
| 2015/0261859 | A1 * | 9/2015 | Isensee | G06F 16/287 |
| | | | | 707/723 |
| 2015/0382047 | A1 * | 12/2015 | Van Os | G06F 16/73 |
| | | | | 725/38 |
| 2016/0094437 | A1 * | 3/2016 | On | H04L 45/306 |
| | | | | 370/352 |
| 2016/0180853 | A1 * | 6/2016 | VanLund | G10L 17/22 |
| | | | | 704/275 |
| 2017/0083285 | A1 * | 3/2017 | Meyers | G10L 15/063 |

(Continued)

*Primary Examiner* — Neeraj Sharma
(74) *Attorney, Agent, or Firm* — Pierce Atwood LLP

(57) ABSTRACT

Systems and methods for establishing a communications system between multiple electronic devices are described herein. In some embodiments, first audio data representing a first utterance may be received from an initiating device. A first user account associated with the initiating device may be determined. After determining that the utterance comprises an intent to communicate with a target, a list of entity names associated with the user account may be generated. Each entity name may represent a user contact associated with the first user account, a user device corresponding to the first user account, and/or a set of entity names representing user contacts and devices. Based on a relative comparison of each entity name to the target's name, an entity name may be selected from the plurality of entity names. A communications session may then be established between the initiating device and a device represented by the selected entity name.

20 Claims, 8 Drawing Sheets

(56) References Cited

U.S. PATENT DOCUMENTS

| | | | | |
|---|---|---|---|---|
| 2017/0169013 A1* | 6/2017 | Sarikaya | ............... | G06F 16/243 |
| 2017/0177716 A1* | 6/2017 | Perez | ................. | G06F 16/3344 |
| 2017/0262523 A1* | 9/2017 | Epstein | ............... | H04L 67/1095 |
| 2018/0276005 A1* | 9/2018 | James | ................ | G06Q 30/0269 |
| 2018/0373568 A1* | 12/2018 | Frost | .................... | G06F 9/5044 |

\* cited by examiner

| | CONDITION | RESULT |
|---|---|---|
| 802a / 802b | INTENT IS TO CALL | REMOVE CONTACTS/DEVICES NOT PREVIOUSLY ENABLED FOR CALLING |
| 804a / 804b | INTENT IS TO DROP-IN | REMOVE CONTACTS/DEVICES NOT PREVIOUSLY ENABLED FOR DROP-IN |
| 806a / 806b | INTENT IS TO SEND MESSAGE | REMOVE CONTACTS/DEVICES THAT HAVEN'T ENABLED MESSAGING |
| 808a / 808b | A MEANS OF COMMUNICATION IS SPECIFIED | REMOVE CONTACTS/DEVICES THAT DON'T SUPPORT THE SPECIFIED MEANS |
| 810a / 810b | ENTRY REPRESENTS A DEVICE ASSOCIATED WITH A HIGH-PRIORITY GROUP OF DEVICES BELONGING TO USER ACCOUNT | REMOVE ALL OTHER ENTRIES |
| 812a / 812b | ENTRY REPRESENTS AN ENTITY THAT IS BUSY PERFORMING ANOTHER ACTIVITY | REMOVE BUSY ENTRIES |
| 814a / 814b | IDENTIFIERS MATCH IDENTIFIER OF INITIATING DEVICE | REMOVE MATCHING ENTRIES |

SYSTEMS AND METHODS FOR DEVICE COMMUNICATIONS

BACKGROUND

Electronic devices, such as audio (e.g., voice) controlled electronic devices, are capable of performing various functions. For instance, an individual may speak a command to a device and, in response, the device may perform various functions and/or a system may cause one or more actions to be performed by another device. Some voice-controlled electronic devices may also include display screens capable of outputting content.

BRIEF DESCRIPTION OF THE DRAWINGS

FIG. 8 is an illustrative diagram of a table of conditions and corresponding filtration results, in accordance with various embodiments.

DETAILED DESCRIPTION

The present disclosure, as set forth below, is generally directed to various embodiments of systems, methods, and devices related to allowing users to communicate with one another using voice-controlled devices. Devices such as Amazon's Echo are increasingly used by individuals for, among other things, communicating with friends, family, and associates, much like traditional land-line telephones had been used in earlier times. However, instead of requiring a user to dial a numerical code associated with the user's intended recipient, a voice-controlled devices can allow the user to utter the name and/or location of the intended recipient. While this provides a better user experience, it requires the system to be smarter and, without leveraging the innovation discussed herein, may lead to ambiguities, resulting in failures by the system architecture to open the proper communication session. For instance, a user may speak the utterance, "Call Kitchen" to a voice-controlled device while sitting in a bedroom. The user may have a list of contacts associated with a user account to which the voice-controlled device corresponds. Those contacts may include a restaurant named with "Kitchen" in the name (e.g., "Bob's Kitchen"). The user may also have a user device in the user's kitchen, which the user has named "Kitchen." Such ambiguities may lead to undesirable results, such as communications being sent to the wrong device, or possibly, a total failure to open a communication session with any other device. In order to resolve these ambiguities, various disambiguation techniques may be applied to differentiate between potential target devices, which can resolve the ambiguities and prevent such undesirable results. Through innovation, new technical solutions are provided herein that can be used to remove such ambiguities and determine the correct intended recipient for a user's communications.

Figure 1:
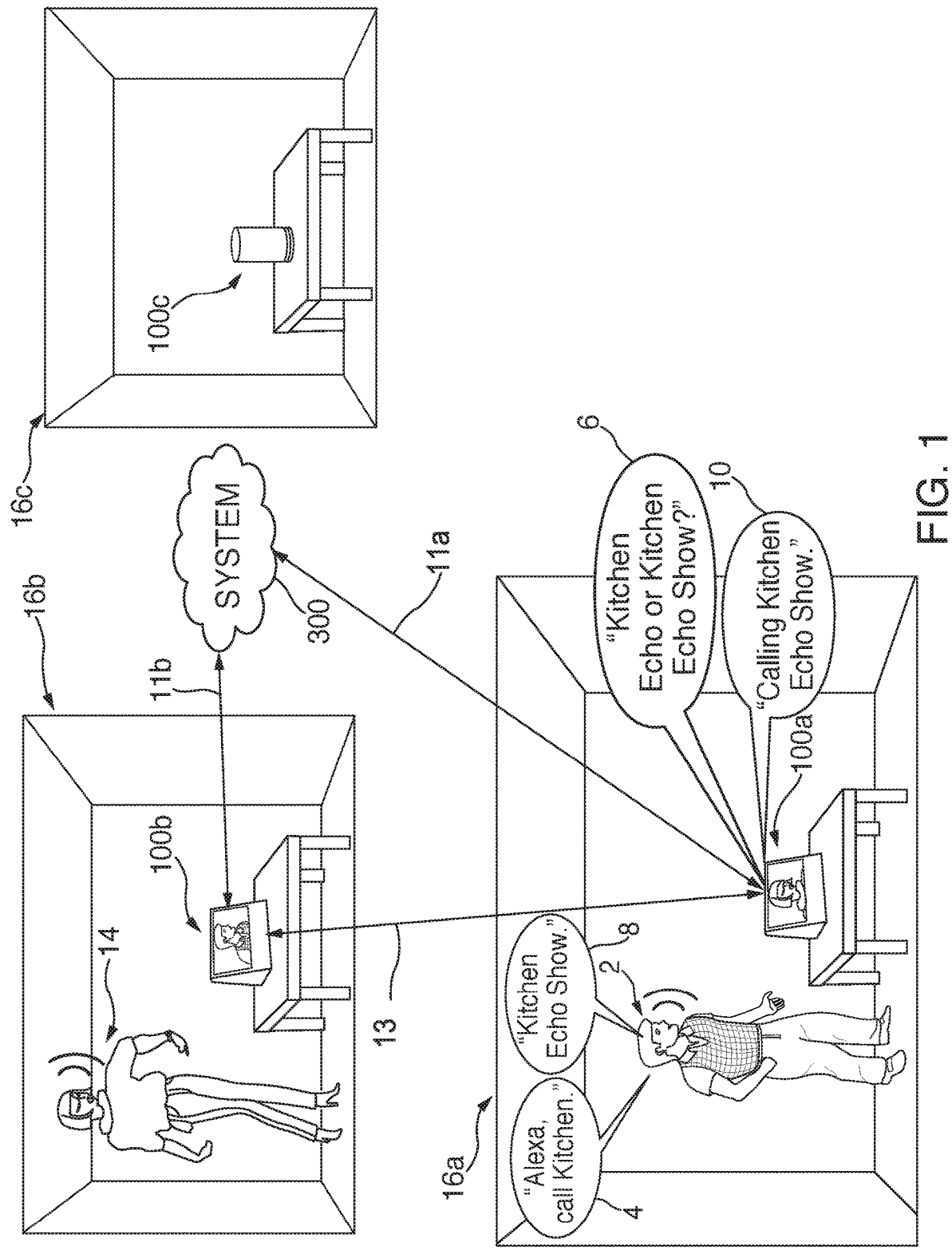
FIG. 1 is an illustrative diagram of an exemplary system for establishing a communications session between an initiating device and a target device, in accordance with various embodiments.

FIG. 1 is an illustrative diagram of an exemplary system for establishing a communications session between an initiating device and a target device, in accordance with various embodiments. In a non-limiting, illustrative embodiment, an individual 2 in one location 16a may wish to communicate with another individual 14 who may be located in another location 16b. Accordingly, individual 2 may speak an utterance 4, with the intent of initiating and establishing a communications session with individual 14. For example, utterance 4 may be "Alexa, call Kitchen." In this example, the name "Alexa" may correspond to a wakeword for a voice activated electronic device 100a, the term "call" may correspond to an invocation phrase to initiate a communications session with another device, and the name "Kitchen" may correspond to some entity associated with a user account for individual 2. For instance, the entity may be either (1) a contact associated with a user account for individual 2; or (2) a device associated with a user account for individual 2. Upon determining that utterance 4 includes a wakeword, voice activated electronic device 100a may begin sending audio data representing utterance 4 to computing system 300 (which is described in greater detail below with reference to FIG. 3) via channel 11a.

Computing system 300 may include a speech-processing system that, in some embodiments, is configured to determine an intent of a spoken utterance using the received audio data, and generate a response to the utterance and/or cause one or more actions to be performed. For instance, upon receiving audio data representing utterance 4, the speech-processing system may generate text data representing the audio data by performing automatic speech recognition ("ASR") processing on the audio data, and may utilize natural language understanding ("NLU") processing performed on the text data to determine an intent of the utterance. The speech-processing system may further determine that an intent of the utterance includes an intent to communicate with a target called "Kitchen."

In the illustrative embodiment, individual 2 may seek to establish a communications session with a particular device associated with a user account for individual 2 (e.g., a device named "Kitchen") using voice activated electronic device 100a. In some embodiments, a user account associated with individual 2 may have a contact named "Kitchen" as well as a number of devices nicknamed "Kitchen." Thus, it may be necessary for computing system 300 to perform various processing methods to determine whether to establish a communications session between electronic device 100a and a contact named "Kitchen" or a device named "Kitchen." In the illustrative embodiment, the user account has one contact named "Bob Kitchen" and two devices called "Kitchen" associated with the user account. For instance, the user account may have two homes, with a device located in a respective kitchen of each home (e.g., kitchen device 100b and kitchen device 100c). Accordingly, computing system 300 may generate a list of contacts and devices associated with the user account. The contacts and devices may be represented by a name given to each contact and device, referred to herein as "entity names." The entity names on the list may include the contact name "Bob Kitchen," as well as devices names "Kitchen Echo Show" (corresponding to kitchen device 100*b*) and "Kitchen Echo" (corresponding to kitchen device 100*c*, which may be located in a third location 16*c*). Computing system 300 may then compare each entity name on the list to the word "Kitchen" to determine a confidence level for to each entity name. A confidence level may be a value that is determined by how closely a particular entity name matches the name of the target. For instance, in an embodiment, an entity name (i.e., text data) representing the contact named "Bob Kitchen" and text data representing the target named "Kitchen" are not identical, and based on statistical data, computing system 300 may determine a confidence level of "MEDIUM" with respect to the entity name "Bob Kitchen." Additionally, entity names "Kitchen Echo Show" and "Kitchen Echo" are not identical to text data representing the target, but may, based on historical data have a higher confidence level than "Bob Kitchen." For instance, computing system may determine a confidence level of "HIGH" with respect to the entity names "Kitchen Echo Show" and "Kitchen Echo."

When the confidence levels with respect to the device names are set higher than the confidence level with respect to contact names, computing system 300 may determine that the target is a device if the two names being compared are a device and a contact. In some embodiments, further processing may be necessary to determine which device entity name represents the target device to establish a communications session with electronic device 100*a*. For instance, in some embodiments computing system 300 may generate and transmit data via channel 11*a* to electronic device 100*a* that includes instructions to output audio signal 6. Audio signal 6 can represent, for example, a prompt to a user with language that can ask, "Kitchen Echo Show, or Kitchen Echo?" In response, individual 2 may speak utterance 8, which may include the words "Kitchen Echo Show." Electronic device may then send audio data representing utterance 8 to computing system 300 via channel 11*a*. Computing system 300 may then perform further ASR and/or NLU processing to determine that the user has indicated an intent to initiate a communications session with device 100*b*, which is represented by entity name "Kitchen Echo Show." Thus, computing system 300 may determine that kitchen device 100*b* is the target entity. Accordingly, computing system 300 may cause device 100*a* to output audio signal 10, which may state "Calling Kitchen Echo Show." Computing system 300 may then communicate with kitchen device 100*b* via channel 11*b* to establish a communications session between electronic device 100*a* and kitchen device 100*b* via channel 13.

Figure 2:
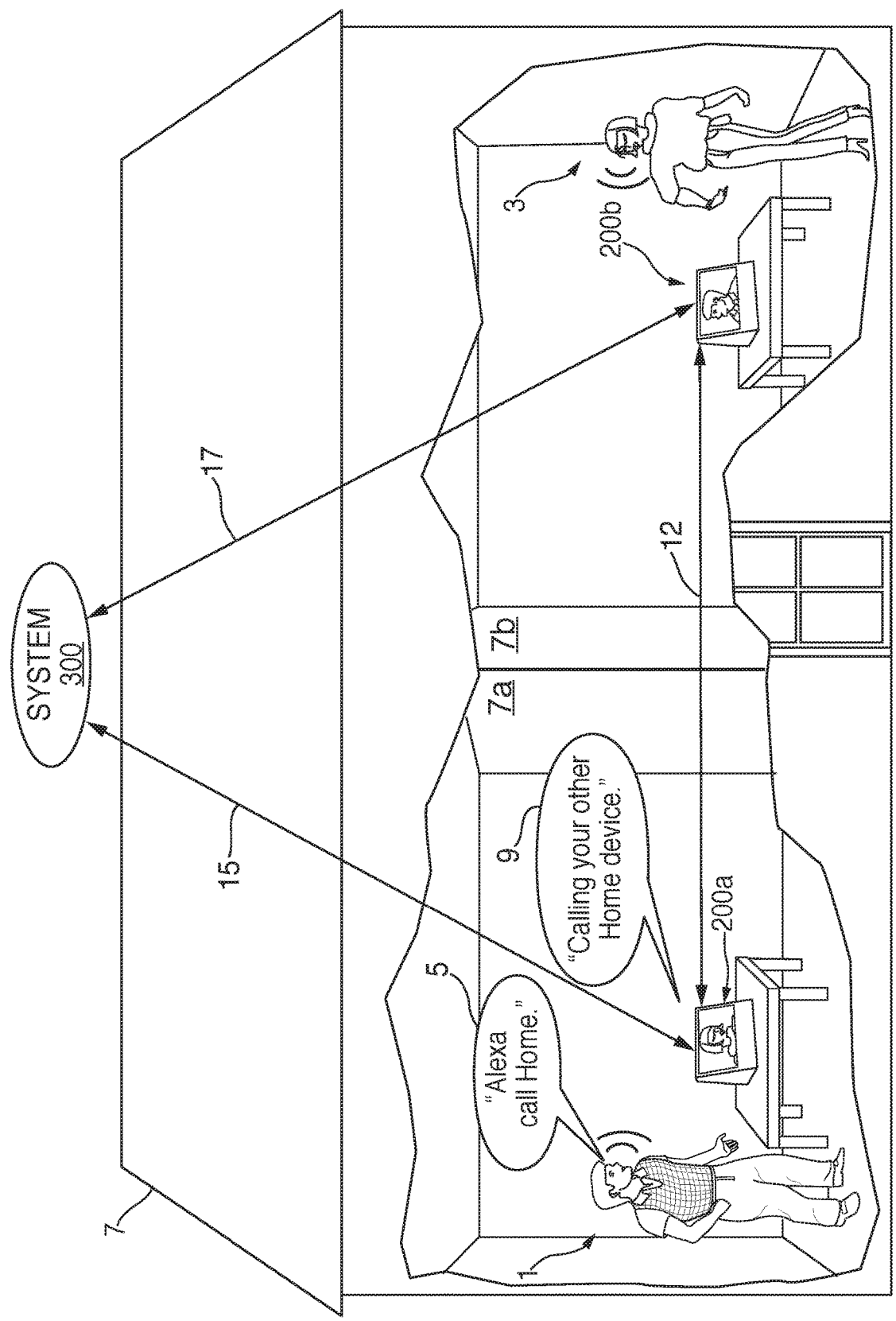
FIG. 2 is an illustrative diagram of another exemplary system for establishing a communications session between an initiating device and a target device, in accordance with various embodiments.

FIG. 2 is an illustrative diagram of another exemplary system for establishing a communications session between an initiating device and a target device, in accordance with various embodiments. In a non-limiting, illustrative embodiment, an individual 1 may be located in a first room 7*a* of the same household 7 (or alternatively, another building or enclosure) as another individual 3 who is located in a second room 7*b* of household 7, where a target device 200*b* is also located. Individual 1 may wish to communicate with individual 3 via one or more voice-activated devices. Accordingly, individual 1 may speak utterance 5 "Alexa, call Home" to initiating device 200*a*, which is also located in the first room 7*a*. Initiating device 200*a* may detect the audio signal "Alexa" as a wakeword, and configure itself to receive the remainder of utterance 5. Initiating device 200*a* may then receive the entirety of utterance 5 and convert it into audio data that digitally represents utterance 5. Initiating device 200*a* may then open channel 15 through which initiating device 200*a* may transmit the audio data to computing system 300.

In an exemplary embodiment, system 300 may use ASR processing and NLU processing (which will be described in further detail below with respect to FIG. 3) to determine that the intent of utterance 5 is to communicate with a target. System 300 may further determine a name representing the target (i.e., text data representing a unique description of the target). For instance, system 300 may use NLU processing to determine that the target of the intent is named "Home." System 300 may then access the contacts and devices of a user account associated with initiating device 200*a*. Once system 300 receives the contacts and devices, system 300 may analyze an entity name representing each contact and device based on how closely each entity name matches the name of the target "Home," in order to determine a confidence level for each entity name. A confidence level may be a numerical value or verbal assessment (e.g., "HIGH," "MEDIUM," or "LOW") of how closely an entity name matches the name of a target. System 300 may then rank each entity name in order from highest confidence level to lowest confidence level.

In an exemplary embodiment, a group of contacts and/or devices may be associated with a user account under the any given name. For instance, a group of devices may be associated with a user account associated with initiating device 200*a* under the entity name "Home." This "Home" group may include multiple user profiles and devices. For instance, entity names representing initiating device 200*a* and target device 200*b* may be stored in a user account associated with initiating device 200*a*, both individually, and collectively under an entity name representing a group named "Home." In the exemplary embodiment of FIG. 2, system 300 may determine that the group "Home" is represented by the entity name having highest confidence level. In some embodiments, there may be multiple devices included in a single entity name. Thus, system 300 would need to determine which device to initiate a communications session with initiating device 200*a*. Accordingly, in some embodiments, system 300 would generate a prompt for initiating device 200*a* to present to individual 1 such that initiating device 200*a* outputs an audio signal representing a message, such as, "Which Home device would you like to call?"

In some embodiments, however, system 300 may determine that the "Home" contact includes only two devices, and that initiating device 200*a* is one of those devices. As such, system 300 may filter out any entity name that represents initiating device 200*a*, leaving the entity name representing target device 200*b* as the only option as a potential target. Accordingly, as shown in the embodiment of FIG. 2, system 300 may select the entity name representing target device 200*b* and generate data representing a message for initiating device to output as audio signal 9 to individual 1, such as "Calling your other Home device." System 300 may then initiate a communications session between initiating device 200*a* and target device 200*b* by establishing a channel 17 with target device 200*b*, and communicating with initiating device 200*a* and target device 200*b* such that a communications channel 12 is established between initiating device 200*a* and target device 200*b*.

Figure 3:
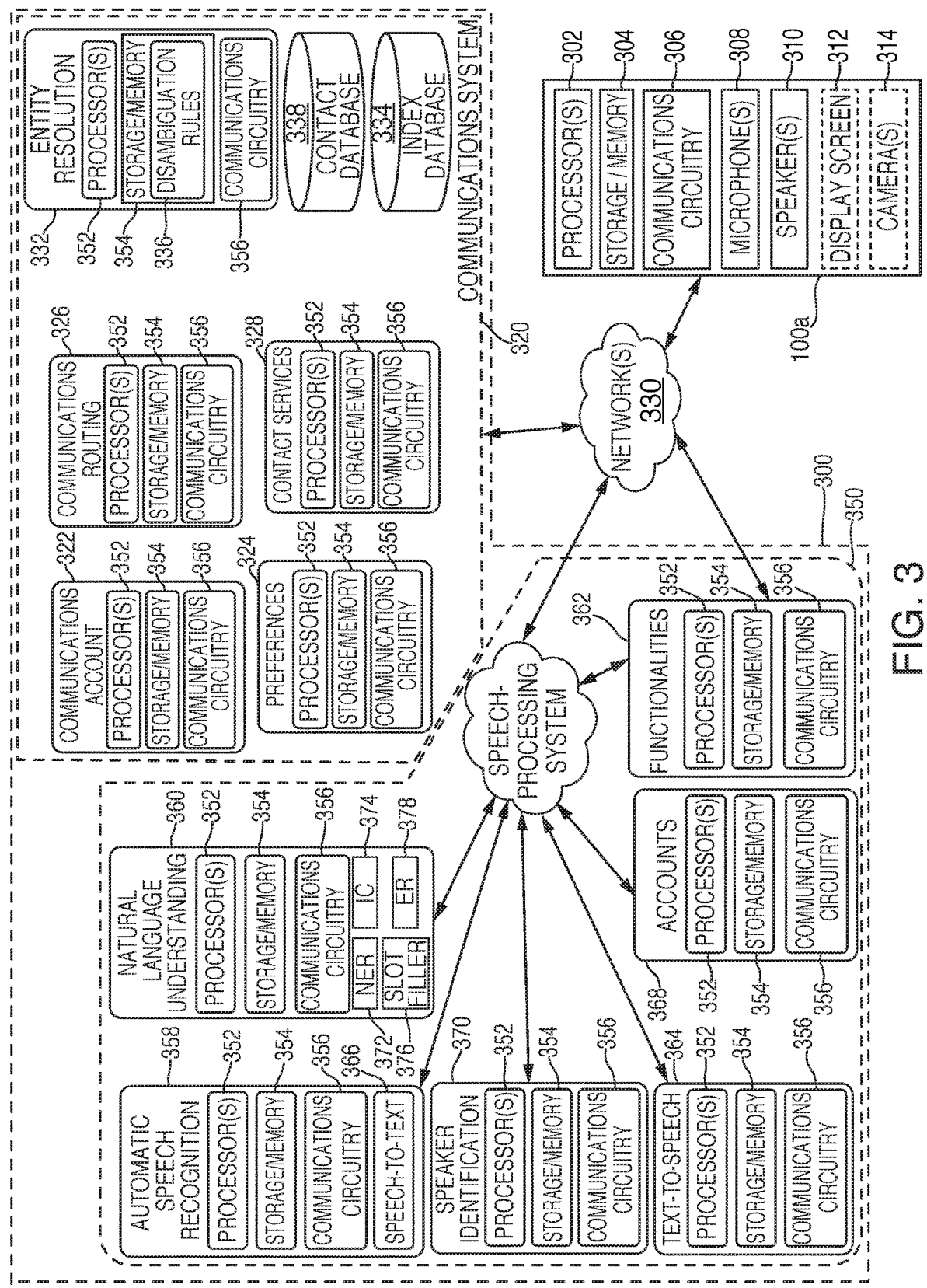
FIG. 3 is an illustrative diagram of an exemplary system architecture that can be utilized by, for example, the systems shown in FIG. 1 and FIG. 2, in accordance with various embodiments.

FIG. 3 is an illustrative diagram of the exemplary system architecture of FIG. 1, in accordance with various embodiments. Electronic device 100a may, in some embodiments, include sound controlled functionality, such as one or more voice or sound activated components. In some embodiments, electronic device 100a may be configured such that it may communicate with computing system 300, and in particular a speech-processing system 350, in response to detecting an utterance including a wakeword, which may subsequently be followed by a request, a question, a statement, or an intent, for instance. Similarly, electronic device 100a may alternatively or additionally include one or more manually activated components for manually controlled functionality. In this particular scenario, electronic device 100a may also be configured, in some embodiments, to communicate with computing system 300, and thus speech-processing system 350, in response to a manual input being detected by one or more input mechanisms, such as a touch screen, a button, and/or a switch, for example.

In non-limiting embodiments, electronic device 100a may be capable of being activated in response to detecting a specific sound, such as a wakeword, as well as, or alternatively, via one or more inputs. After detecting a specific sound (e.g., a wakeword or trigger expression), electronic device 100a may recognize commands (e.g., audible commands, inputs, etc.) within captured audio, and may perform one or more actions in response to the received commands. Furthermore, electronic device 100a may also be configured to perform one or more actions in response to detecting a particular touch, or other mechanical inputs via electronic device 100a.

Electronic device 100a may correspond to any suitable type of electronic device including, but not limited to, desktop computers, mobile computers (e.g., laptops, ultrabooks), mobile phones, smart phones, tablets, televisions, set top boxes, smart televisions, personal display devices, large scale display devices (e.g., billboards, street signs, etc.), personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., ships, trains, airplanes, etc.), wearable devices (e.g., watches, pins/broaches, headphones, etc.), and/or smart accessories (e.g., light bulbs, light switches, electrical switches, etc.). In some embodiments, electronic device 100a may be relatively simple or basic in structure such that no, or a minimal number of, mechanical input option(s) (e.g., keyboard, mouse, track pad) or touch input(s) (e.g., touch screen, buttons) are included. For example, electronic device 100a may be able to receive and output audio, and may include power, processing capabilities, storage/memory capabilities, and communication capabilities. However, in other embodiments, electronic device 100a may include one or more components for receiving mechanical inputs or touch inputs, such as a touch screen and/or one or more buttons.

Electronic device 100a, in some embodiments, may include a minimal number of input mechanisms, such as a power on/off switch such that functionality of electronic device 100a may solely or primarily be through audio input and audio output. For example, electronic device 100a may include, or be in communication with, one or more microphones that listen for a wakeword by continually monitoring local audio. In response to the wakeword being detected, electronic device 100a may establish a connection with computing system 300 and/or speech-processing system 350, send audio data to computing system 300 and/or speech-processing system 350, and await/receive a response from computing system 300 and/or speech-processing system 350. In some embodiments, however, non-voice/sound activated devices may also communicate with computing system 300 and/or speech-processing system 350 (e.g., push-to-talk devices). For example, in response to a button or touch screen being pressed, or a button or touch screen being pressed and held, a microphone associated with electronic device 100a may begin recording local audio, and may establish a connection with computing system 300 and/or speech-processing system 350, send audio data representing the captured audio to computing system 300 and/or speech-processing system 350, and await/receive a response from computing system 300 and/or speech-processing system 350.

Persons of ordinary skill in the art will recognize that although in the illustrative embodiment, computing system 300 includes speech-processing system 350 and communications system 320, this is merely exemplary, and speech-processing system 350 and communications system 320 may be separate from computing system 300. For example, speech-processing system 350 and/or communications system 320 may be located within a dedicated computing device, which may or may not be in communication with computing system 300 and/or one or more additional devices.

Electronic device 100a may include one or more processors 302, storage/memory 304, communications circuitry 306, one or more microphones 308 or other audio input devices (e.g., transducers), one or more speakers 310 or other audio output devices, a display screen 312, and one or more cameras 314 or other image capturing components. However, one or more additional components may be included within electronic device 100a, and/or one or more components may be omitted. For example, electronic device 100a may also include a power supply or a bus connector. As still yet another example, electronic device 100a may include one or more additional input and/or output mechanisms, such as one or more buttons, or one or more switches or knobs. As another example, electronic device 100a may lack a display screen. Furthermore, while electronic device 100a may include multiple instances of one or more components, for simplicity only one of each component has been shown.

In some embodiments, electronic device 100a may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In some embodiments, electronic device 100a may be in communication with an additional processing device including one or more of: processor(s) 302, storage/memory 304, communications circuitry 306, microphone(s) 308, speaker(s) 310, display screen 312, and/or camera(s) 314. For example, a centralized control device of electronic device 100a may include one or more microphone(s) 308. These microphone(s) 308 may receive audio input signals, which in turn may be sent to computing system 300 and/or speech-processing system 350 in response to a wakeword engine of electronic device 100a determining that a wakeword was uttered.

Processor(s) 302 may include any suitable processing circuitry capable of controlling operations and functionality of electronic device 100a, as well as facilitating communications between various components within electronic device 100a. In some embodiments, processor(s) 302 may include a central processing unit ("CPU"), a graphic processing unit ("GPU"), one or more microprocessors, a digital signal processor, or any other type of processor, or any combination thereof. In some embodiments, the functionality of processor(s) 302 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 302 may include its own local memory, which may store program components, program data, and/or one or more operating systems. However, processor(s) 302 may run an operating system ("OS") for electronic device 100a, and/or one or more firmware applications, media applications, and/or applications resident thereon. In some embodiments, processor(s) 302 may run a local client script for reading and rendering content received from one or more websites. For example, processor(s) 302 may run a local JavaScript client for rendering HTML or XHTML content received from a particular URL accessed by electronic device 100a.

Storage/memory 304 may include one or more types of storage mediums such as any volatile or non-volatile memory, or any removable or non-removable memory implemented in any suitable manner to store data for electronic device 100a. For example, information may be stored using computer-readable instructions, data structures, and/or program components. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 304 may be implemented as computer-readable storage media ("CRSM"), which may be any available physical media accessible by processor(s) 302 to execute one or more instructions stored within storage/memory 304. In some embodiments, one or more applications (e.g., gaming, music, video, calendars, lists, etc.) may be run by processor(s) 302, and may be stored in memory 304.

In some embodiments, storage/memory 304 may store one or more audible and/or visual messages to be provided to electronic device 100a for indicating that a communications session is about to end if speech is not detected. For example, storage/memory 304 may store one or more audible messages and/or GUIs that include a counter that counts down from a preset time until zero, at which point the communications session may end.

In some embodiments, storage/memory 304 may include a media system, which may be configured to facilitate communications between electronic devices 100a and computing system 300. For example, the media system may store one or more communications protocols that may be executed by processor(s) 302 for facilitating communications for device 100a. In some embodiments, a sessions initiation protocol ("SIP") may be used to facilitate media transfer between electronic device 100a and one or more components of computing system 300 (e.g., communications system 320) and another electronic device 100a. SIP, for example, is an application layer protocol that is text based, and may employ Real-time Transport Protocol ("RTP") or Secure Real-time Transport Protocol ("SRTP") functions. In particular, PJSIP (PJSIP is an open source, multimedia communications library that implements various standard-based communication protocols) communications functionality may be employed by the media system to support audio, video, presence, and messaging communications for electronic device 100a. In some embodiments, a Web Real-Time Communications ("WebRTC") protocols may be employed by electronic device 100a. In a non-limiting embodiment, the media system may include instructions that indicate which communications protocols to employ for facilitating media transfer between devices based on a device type of electronic device 100a. For example, if electronic device 100a does not include display 312 and/or camera 314, then the media system may indicate that PJSIP should be used, whereas if electronic device 100 includes display 312 and/or camera 314 then the media system may indicate that WebRTC protocols should be used.

In some embodiments, storage/memory 304 may include one or more components and/or databases, such as a speech activity detection system (described in greater detail below with reference to speech activity detection system 322), a speech recognition component, a wakeword database, a sound profile database, and a wakeword detection component. The speech recognition component may, for example, include an automatic speech recognition ("ASR") component that recognizes human speech in detected audio. The speech recognition component may also include a natural language understanding ("NLU") component that determines user intent based on the detected audio. Also included within the speech recognition component may be a text-to-speech ("TTS") component capable of converting text to speech to be outputted by speaker(s) 310, and/or a speech-to-text ("STT") component capable of converting received audio signals into text to be sent to computing system 300 and/or speech-processing system 350 for processing.

The wakeword database may be a database stored locally by storage/memory 304 of electronic device 100a, and may include a list of current wakewords for electronic device 100a, as well as one or more previously used, or alternative, wakewords electronic device 100a. In some embodiments, an individual may set or program a wakeword for their electronic device 100a. The wakeword may be programmed directly on electronic device 100a, or a wakeword or wakewords may be set by the individual via a local client application that is in communication with computing system 300 and/or speech-processing system 350. For example, an individual may use their mobile device having the speech-processing system application running thereon to set the wakeword. The specific wakeword may then be communicated from the mobile device to speech-processing system 350, which in turn may send/notify electronic device 100a of the individual's selection for the wakeword. The selected activation may then be stored in the wakeword database of storage/memory 304. In some embodiments, additional trigger expressions or permutations of the wakeword may also be stored within storage/memory 304. For example, specific trigger expressions or words that indicate the presence of the wakeword may also be stored within storage/memory 304. In some embodiments, audio watermarks, indicating a specific action or message, may also be stored within storage/memory 204.

In some embodiments, sound profiles for different words, phrases, commands, or audio compositions are also capable of being stored within storage/memory 304, such as within a sound profile database. For example, a sound profile of audio may be stored within the sound profile database of storage/memory 304 on electronic device 100a. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection component may include an expression detector that analyzes an audio signal produced by microphone(s) 308 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 308. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 308. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally, a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, electronic device 100a may then begin transmitting the audio signal to speech-processing system 350 for detecting and responds to subsequent utterances made by an individual.

Communications circuitry 306 may include any circuitry allowing or enabling one or more components of electronic device 100a to communicate with one another, one or more additional devices, servers, and/or systems. For example, communications circuitry 306 may facilitate communications between electronic device 100a and computing system 300. As an illustrative example, audio data representing an utterance (e.g., utterance 4 of FIG. 1) may be transmitted over a network 330, such as the Internet, to computing system 300 using any number of communications protocols. For example, network(s) 330 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between electronic device 100a and computing system 300. In some embodiments, electronic device 100a and computing system 300 and/or one or more additional devices or systems (e.g., speech-processing system 350) may communicate with one another via a web browser using HTTP. Various additional communication protocols may be used to facilitate communications between electronic device 100a and computing system 300, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Communications circuitry 306 may use any communications protocol, such as any of the previously mentioned exemplary communications protocols. In some embodiments, electronic device 100a may include an antenna to facilitate wireless communications with a network using various wireless technologies (e.g., Wi-Fi, Bluetooth, radiofrequency, etc.). In yet another embodiment, electronic device 100a may include one or more universal serial bus ("USB") ports, one or more Ethernet or broadband ports, and/or any other type of hardwire access port so that communications circuitry 306 allows electronic device 100a to communicate with one or more communications networks.

Electronic device 100a may also include one or more microphones 308 and/or transducers. Furthermore, one or more microphones located within a separate device may be in communication with electronic device 100a to capture sounds for electronic device 100a. Microphone(s) 308 may be any suitable component capable of detecting audio signals. For example, microphone(s) 308 may include one or more sensors for generating electrical signals and circuitry capable of processing the generated electrical signals. In some embodiments, microphone(s) 308 may include multiple microphones capable of detecting various frequency levels. As an illustrative example, electronic device 100a may include multiple microphones (e.g., four, seven, ten, etc.) placed at various positions about electronic device 100a to monitor/capture any audio outputted in the environment where electronic device 100a is located. The various microphones 308 may include some microphones optimized for distant sounds, while some microphones may be optimized for sounds occurring within a close range of electronic device 100a. In some embodiments, microphone(s) 308 may only begin to detect audio signals in response to a manual input to electronic device 100a. For example, a manually activated device may begin to capture audio data using microphone(s) 308 in response to a user input, such as pressing a button, tapping a touch screen, or providing any touch input gesture to a touch input component.

Electronic device 100a may include one or more speakers 310. Furthermore, electronic device 100a may be in communication with one or more speaker(s) 310. Speaker(s) 310 may correspond to any suitable mechanism for outputting audio signals. For example, speaker(s) 310 may include one or more speaker units, speaker housings, transducers, arrays of speakers, and/or arrays of transducers that may be capable of broadcasting audio signals and or audio content to a surrounding area where electronic device 100a may be located. In some embodiments, speaker(s) 310 may include headphones or ear buds, which may be wirelessly wired, or hard-wired, to electronic device 100a, that may be capable of broadcasting audio directly to an individual.

In some embodiments, one or more microphones 308 may serve as input devices to receive audio inputs. Electronic device 100a, in the previously mentioned embodiment, may then also include one or more speakers 310 to output audible responses. In this manner, electronic device 100a may function solely through speech or audio, without the use or need for any input mechanisms or displays, however this is merely exemplary.

Display screen 312 may correspond to a display device and/or touch screen, which may be any size and/or shape and may be located at any portion of electronic device 100a. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, display screen 312 may correspond to a projected capacitive touch ("PCT"), screen include one or more row traces and/or driving line traces, as well as one or more column traces and/or sensing lines. In some embodiments, display screen 312 may be an optional component for electronic device 100a. For instance, electronic device 100a may not include display screen 312. Such devices, sometimes referred to as "headless" devices, may output audio, or may be in communication with a display device for outputting viewable content.

Display screen 312, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of display screen 312, a capacitance between the object and the conductive material may be formed. Processor(s) 202 may be capable of determining a location of the touch screen associated with where the capacitance change is detected, and may register a touch input as occurring at that location.

In some embodiments, display screen 312 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. Persons of ordinary skill in the art will recognize that one or more additional layers, or spaces between layers, may be included. Furthermore, persons of ordinary skill in the art will recognize that any number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on display screen 312 corresponding to where a conductive object contacted display screen 312.

A change in capacitance may be measured to determine a location on the touch screen where the object has contacted the surface. For example, if an individual touches a point on display screen 312, then a corresponding driving line and sensing line that intersect at that point may be identified. A location of the point may have one or more pixels associated with that location, and therefore one or more actions may be registered for an item or items that are displayed at that location. Processor(s) 302 of electronic device 100a may be configured to determine which pixels are associated with a particular location point, and which item or items are also displayed at that pixel location. Furthermore, electronic device 100a may be configured to cause one or more additional actions to occur to the item or items being displayed on display screen 312 based on a temporal duration the touch input, and or if one or more additional touch inputs are detected. For example, an object that contacted display screen 312 at a first location may be determined, at a later point in time, to contact display screen 312 at a second location. In the illustrative example, an object may have initially contacted display screen 312 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen 312 having 100 driving lines and 100 sensing lines may have 100 intersection points, and therefore 100 individual capacitors, while a touch screen display screen 212 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by electronic device 100, and therefore the fewer driving lines and/or sensing lines used, the smaller the amount of power that is needed to operate the touch screen display.

In some embodiments, display screen 312 may correspond to a high-definition ("HD") display. For example, display screen 312 may display images and/or videos of 720p, 1080p, 1080i, or any other image resolution. In these particular scenarios, display screen 312 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 2,073,600 pixels. However, persons of ordinary skill in the art will recognize that the aforementioned display ratios and pixel numbers are merely exemplary, and any suitable display resolution or pixel number may be employed for display screen 312, such as non-HD displays, 4K displays, and/or ultra high definition displays.

In some embodiments, electronic device 100a may include one or more cameras 314, corresponding to any suitable image capturing component or components capable of capturing one or more images and/or videos. Camera(s) 314 may, in some embodiments, be configured to capture photographs, sequences of photographs, rapid shots (e.g., multiple photographs captured sequentially during a relatively small temporal duration), videos, or any other type of image, or any combination thereof. In some embodiments, electronic device 100a may include multiple cameras 314, such as one or more front-facing cameras and/or one or more rear facing cameras. Furthermore, camera(s) 314 may be configured to recognize far-field imagery (e.g., objects located at a large distance away from electronic device 100a) or near-filed imagery (e.g., objected located at a relatively small distance from electronic device 100a). In some embodiments, the camera(s) may be high-definition ("HD") cameras, capable of obtaining images and/or videos at a substantially large resolution (e.g., 726p, 1080p, 1080i, etc.). In some embodiments, camera(s) 214 may be optional for electronic device 100a. For instance, camera(s) 314 may be external to, and in communication with, electronic device 100a. For example, an external camera may be capable of capturing images and/or video, which may then be provided to electronic device 100a for viewing and/or processing.

Persons of ordinary skill in the art will recognize that, in some embodiments, display screen 312 and/or camera(s) 314 may be optional for electronic device 100a. For instance, electronic device 100a may function using audio inputs and outputting audio, and therefore display screen 312 and/or camera(s) 314 may not be included. Furthermore, in some embodiments, electronic device 100a may not include display screen 312 and/or camera(s) 314, but instead may be in communication with display screen 312 and/or camera(s) 314. For example, electronic device 100a may be connected to a display screen via a Wi-Fi (e.g., 802.11 protocol) connection such that visual content sent to electronic device 100a may be sent to the display screen, and output thereby.

In one exemplary embodiment, electronic device 100a may include an additional input/output ("I/O") interface. For example, electronic device 100a may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of electronic device 100a may include one or more lights, light emitting diodes ("LEDs"), or other visual indicator(s). Persons of ordinary skill in the art will recognize that, in some embodiments, one or more features of the output portion of the I/O interface may be included in a purely voice activated version of electronic device 100a. For example, one or more LED lights may be included on electronic device 100a such that, when microphone(s) 308 receives audio, the one or more LED lights become illuminated signifying that audio has been received by electronic device 100a. In some embodiments, one or more vibrating mechanisms or other haptic features may be included with electronic device 100a to provide a haptic response to an individual.

In some embodiments, electronic device 100a may include radio-frequency identification ("RFID") functionality and/or near field communication ("NFC") functionality. Furthermore, in some embodiments, electronic device 100a may include one or more infrared ("IR") sensors and one or more IR emitters. The IR sensors/emitters may be used to determine depth information. For example, in some embodiments, a distance of an individual from electronic device 100 may be determined using the one or more IR sensors/emitters. Depth determination may be performed using any depth determination technique. In some embodiments, a distance between an individual and electronic device 100a may be employed as a basis for presenting content with varying density using display screen 312. For example, when an individual is at a distance A from electronic device 100a, electronic device 100a may display weather data for a current day. However as the user moves closer to electronic device 100a, such as at a distance B from electronic device 100a, which may be less than distance A, electronic device 100a may display weather data for a current week. For instance, as the individual gets closer to electronic device 100a, the ability of the individual to see denser content increases, and as the individual moves father away from electronic device 100a, the individual's ability to see denser content decreases. This, for example, may ensure that the content displayed by electronic device 100a is continually relevant and readable by the individual.

Computing system 300, in a non-limiting, exemplary embodiment, may include speech-processing system 350. However, in other embodiments, speech-processing system 350 may be separate from, or in communication with, computing system 300. Generally, speech-processing system 350 may, in some embodiments, include one or more remote devices capable of receiving and sending content from/to one or more electronic device, such as electronic device 100a. Speech-processing system 350 may include various components and components including, but not limited to, ASR component 358, NLU component 360, functionalities component 362, TTS component 364, and user accounts component 368. In some embodiments, speech-processing system 350 may also include computer readable media, including, but not limited to, flash memory, random access memory ("RAM"), and/or read-only memory ("ROM"). Speech-processing system 350 may also include various components that store software, hardware, logic, instructions, and/or commands for speech-processing system 350, such as a speaker identification ("ID") component-component, or any other component, or any combination thereof.

ASR component 358 may be configured to recognize human speech in detected audio, such as audio captured by microphone(s) 308 which may then be transmitted to speech-processing system 350. ASR component 358 may include, in some embodiments, one or more processor(s) 352, storage/memory 354, and communications circuitry 356. Processor(s) 352, storage/memory 354, and communications circuitry 356 may, in some embodiments, be substantially similar to processor(s) 302, storage/memory 304, and communications circuitry 306, which are described in greater detail above, and the aforementioned descriptions may apply. In some embodiments, ASR component 358 may include speech-to-text ("STT") component 366. STT component 366 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

ASR component 358 may include an expression detector that analyzes audio signals received by speech-processing system 350, such as the expression detector mentioned above with regards to electronic device 100a. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword or phrase is represented within the audio signal. The expression detector may then compare that score to a threshold value to determine whether the wakeword or phrase will be declared as having been spoken.

ASR component 358 may further attempt to match received feature vectors to language phonemes and words as known in acoustic models and language models stored within storage/memory 354 of ASR component 358. Recognition scores may be determined for the feature vectors based on acoustic information and language information. The acoustic information may be used to calculate an acoustic score representing a likelihood that the intended sound represented by a group of feature vectors matches a language phoneme. The language information may be used to adjust the acoustic score by considering what sounds and/or words are used in context with each other, thereby improving the likelihood that the speech recognition process will output speech results that make sense grammatically. The specific models used may be general models or may be models corresponding to a particular domain, such as music, application enablement/disablement, shopping, etc.

ASR component 358 may generate results in the form of a single textual representation of the speech, an N-best list including multiple hypotheses and respective scores, and/or lattice, for example, which may be sent to NLU component 360 for processing. One example might be a conversion of text from ASR component 358 into commands for execution, either by electronic device 100a, speech-processing system 350, communications system 320, or by another device, such as a separate device or server capable of performing one or more additional functionalities thereon (e.g., a television capable of outputting video content).

NLU component 360 may be configured such that it determines user intent based on the received audio data. For example, NLU component 360 may determine that the intent of utterance 4 in FIG. 1 is for initiating a communications session with a device, associated with a particular entity name (e.g., initiate a communications session with "Cruise"). In response to determining the intent of the utterance, NLU component 360 may communicate the received command to an appropriate subject matter server or skill on functionalities component 362 to perform one or more tasks, and/or retrieve an appropriate response or response information. NLU component 360 may include processor(s) 352, storage/memory 354, and communications circuitry 356 which, in some embodiments, may be substantially similar to processor(s) 302, storage/memory 304, and communications circuitry 306 of electronic device 100a, and the previous description may apply.

NLU component 360 may include a named entity recognition ("NER") component 372, which may be used to identify portions of text that correspond to a named entity recognizable by NLU component 360. A downstream process called named entity resolution may be configured to link a portion of text to an actual specific known entity. To perform named entity resolution, the component may utilize gazetteer information stored in an entity library storage. The gazetteer information may be used for entity resolution, for example, matching ASR results with different entities (such as song titles, contact names, device names, etc.). Gazetteers may be linked to a user account or profile in user accounts component 368, certain domains (e.g., music or shopping), communications account component 322 of communications system 320, and/or may be organized in a variety of other ways.

Generally, NLU component 360 takes textual input and attempts to make a semantic interpretation of the text. That is, NLU component 360 may be configured to determine a meaning of text based on the individual words so that NLU components 360 can then respond appropriately to the meaning of those words. In some embodiments, NLU component 360 may interpret a text string to derive an intent or a desired action of the utterance (e.g., utterance 4) as well as the pertinent pieces of information in the text that allow an action to be completed. For example, if a spoken utterance processed by ASR component 358 results in an output of text, "call Mom," NLU component 360 may determine that the intent of the utterance is to activate a telephone, or telephone functionality, and to initiate a call with a contact represented by an entity name "Mom." In some embodiments, NLU component 360 may process several textual inputs related to the same utterance. For example, if ASR component 358 outputs N text segments (as part of an N-best list), then NLU component 360 may process all N outputs.

As will be discussed further below, NLU component 360 may be configured to parse and tag-annotate text. For example, for the text "call Mom," "call" may be tagged as a command (e.g., a command to execute a phone call), and "Mom" may be tagged as a specific target of the command (e.g., user account of a messaging component or a telephone number represented by the entity name "Mom," which may be stored in a contact list and/or a device list). Further, NLU component 360 may be used to provide answer data in response to queries, for example, using knowledge/information stored within storage/memory 354 of NLU component 360 and/or storage/memory of speech-processing system 350.

To correctly perform natural language understanding processing of speech input, NLU component 360 may be configured to determine a domain of an utterance. By determining the domain, NLU component 360 may narrow down which services and functionalities might be offered by an endpoint device (e.g., electronic device 100a, speech-processing system 350, communications system 320, or any other electronic device or system/component). For example, an endpoint device may offer services relating to interactions with a telephone service (e.g., communications routing component 326), a contact list service (e.g., contact services component 328), a calendar/scheduling service, a music player service, etc. As another example, an endpoint device may enable certain services or functionalities for an individual having a user account on speech-processing system 350. Words in a single text query may implicate more than one service, and some services may be functionally linked (e.g., both a telephone service and a calendar service may utilize data from the contact list).

NER component 372 may be configured to receive a query in the form of one or more results from ASR component 358. NER component 372 may then attempt to identify relevant grammars and lexical information that may be used to construe meaning of the one or more results. To do so, NER component 372 may begin by identifying potential domains that may relate to the received query. NLU component 360 may include a database of devices within storage/memory 354 of NLU component 360 that may be used to identify domains associated with specific devices. For example, electronic device 100*a* may be associated with domains for music, telephone functionality, calendar information, contact lists, and/or device-specific communications. In addition, NLU component 360 may store an entity library including database entries for specific services available on a specific device or devices, either indexed by that device's identification number, a customer identification number, a household identification number, and/or using any other suitable indicator.

In one non-limiting embodiment, a domain may represent a discrete set of activities, services, and/or functionalities that have a common theme, such as "communications," "shopping," "music," or "videos." As such, each domain may be associated with a particular language model and/or grammar database, a particular set of intents/actions, and a particular personalized lexicon. In some embodiments, each user account may have its own language model including words, phrases, sentence structures, response templates, and the like, configured for the user account. Each gazetteer may include domain-indexed lexical information associated with a particular account within accounts component 368 and/or electronic device 100*a*. For example, a first gazetteer may include first domain-index lexical information. A user's music-domain lexical information might include album titles, artist names, and song names, for example, whereas a user's contact-list lexical information might include the names of contacts. Since every user's music collection and contact list is presumably different, this personalized information can help to improve entity resolution.

In some embodiments, NLU component 360 may be configured to apply the rules, models, and information applicable to each identified domain. For example, if a query potentially implicates both the communications domain and the music domain, the query may, substantially in parallel, cause the natural language understanding processing to use the grammar models and lexical information for the communications domain, as well as, to use the grammar models and lexical information for the music domain. The responses based on the queries produced by each set of models are scored, with the overall highest ranked result from all applied domains being ordinarily selected to be the correct result.

An intent classification ("IC") component 374 may parse the query to determine an intent or intents for each identified domain, where the intent corresponds to the action to be performed that is responsive to the query. Each domain is associated with a database of words linked to intents for that domain. For example, a communications intent database of a communications domain may link words and phrases such as "call" to a call contact(s) intent, "hang up" to a cease communications intent, and "mute" to a mute volume intent. As another example, a communications intent database of the communications domain may link words and phrases such as "call" to a call contact intent, "message" to a message contact intent, and the like. IC component 374 may be configured to identify potential intents for each domain by comparing words in the query to the words and phrases in that domain's intents database. Traditionally, the determination of an intent by IC component 374 is performed using a set of rules or templates that are processed against the incoming text to identify a matching intent.

In order to generate a particular interpreted response, NER component 372 can apply the grammar models and lexical information associated with the respective domain to actually recognize one or more entities in the text of the query. Each grammar model includes the names of entities (i.e., nouns) commonly found in speech about the particular domain (i.e., generic terms), whereas the lexical information from the gazetteer is personalized to the user(s) and/or the device. For instance, a grammar model associated with the shopping domain may include a database of words commonly used when people discuss shopping.

The intents identified by IC component 374 may be linked to domain-specific grammar frameworks having "slots" or "fields" to be filled. Each slot or field may correspond to a portion of the query text that the system believes corresponds to an entity. For example, if "call Chris" is an identified intent, a grammar framework or frameworks may correspond to sentence structures such as "Call {Contact Name}," "Call {Device Name}," "Get me {Contact Name} on the line," etc. However, to make resolution more flexible, these frameworks would ordinarily not be structured as sentences, but rather based on associating slots with grammatical tags. As another example, if "Call Chris'" is an identified intent, a grammar framework may correspond to sentence structures such as "Call {Chris}." As yet another example, if "Call 'Chris'" is an identified intent of a communications domain, a grammar framework may correspond to a sentence structure such as "Call {Contact Name}," where the slot {Contact Name} has a value "Contact Name" associated with it.

NER component 372 may parse the query to identify words as subject, object, verb, preposition, etc., based on grammar rules and/or models, prior to resolving named entities. The identified verb may be used by IC component 374 to identify intent, which can then be used by NER component 372 to identify frameworks. A framework for an intent of "call" may specify a list of slots/fields/placeholders applicable to place the identified "object" such as, for example, {Contact Name}, {Group Account Name}, {User Account Name}, {Communications Identifier}, and the like. NER component 372 may then search the corresponding fields in the domain-specific and personalized lexicon(s), attempting to match words and phrases in the query, which are tagged as a grammatical object or object modifier, with those identified in the database(s).

This process may include semantic tagging, which is the labeling of a word or a combination of words according to their type/semantic meaning. Parsing may be performed using heuristic grammar rules, or an NER model may be constructed using techniques such as hidden Markov models, maximum entropy models, log linear models, conditional random fields ("CRF"), and the like.

For instance, a query of "Call 'Chris' at work" might be parsed and tagged as {Verb}: "Call," {Object}: "Chris," {Object Preposition}: "at," and {Object Modifier}: "work." At this point in the process, "Call" may be identified as a verb based on a word database associated with a communications domain, which IC component 374 may determine corresponds to the "call contact(s)" intent. No determination has been made as to the meaning of "Chris" and "Work," but based on grammar rules and models, it may be determined that the text of these phrases relate to the grammatical object (i.e., entity) of the query. As simpler illustrative example, a query of "Call 'Contact 1'" may be parsed and tagged as {Verb}: "Call," {Object}: "Contact 1." "Call" may be identified as a verb based on a word database associated with a communications domain, which IC component 374 may determine corresponds to a "call" intent.

The frameworks linked to the intent may then be used to determine what database fields should be searched to determine the meaning of these phrases, such as searching a user's gazette for similarity with the framework slots. So a framework for a "call contact(s)" intent might attempt to resolve the identified object for {Contact Name}, {Device Name}, {Entity Name}, {Application Name}, and {Anaphoric Term} and another framework for the same intent might attempt to resolve the object modifier based on {Contact Name}, and resolve the object based on {Device Name} and {Entity Name} linked to the identified {Contact Name}. Alternatively, the framework for a "call" intent may attempt to resolve the identified object for {Contact Name} or {Communications Identifier}. If the search of the gazetteer does not resolve a slot/field using gazetteer information, NER component 372 may search the database of generic words associated with the particular domain. So, for instance, if the query was "Call Chris at work," after failing to determine a device name or other entity name called "work," NER component 372 may search the domain for devices associated with the contact "Chris."

The results of the natural language understanding processing may be tagged to attribute meaning to the query. So, for instance, "Call Chris at work" might produce a result of: {Domain}: "Communications," {Intent}: "Call contact(s)," {Contact Name}: "Chris," and {Device Name}: "Work." As another example, "Call 'Contact 1'" might produce a result of: {Domain}: Communications, {Intent}: "Call," and {Contact Name}: "Contact 1."

The output from NLU component 360 (which may include tagged text, commands, etc.) may then be sent to an orchestrator and/or a command processor, which may be located on, or may be in communication with, speech-processing system 350. The destination command processor may be determined based on the output of NLU component 360. For example, if NLU component 360 outputs include a command to communicate with a contact, the destination command processor may be a communications application, such as one located on electronic device 100*a* or in a communications playing application configured to execute a command to transmit a particular audio file to another device. If the output of NLU component 360, however, includes a search request, the destination command processor may include a search engine processor, such as one located on a search server, configured to execute a search command. If the output of NLU component 360 includes a request for enablement of an application's functionalities for a particular user account, then the language model for the user account may be updated to include one or more invocations, utterance frameworks, response frameworks, and values for the frameworks, for a particular application. If the output of NLU component 360 includes a request to call a contact, then the destination command processor may include a communications routing processor to initiate a communication with a particular contact's communications identifier.

In some embodiments, NLU component 360 may also include an entity resolution component 378, which allows NLU component 360 to query domains of NLU component 360 to determine which domain or domains believe that they can handle a given request. Upon performing the query, each domain may return a "score" indicating a likelihood that they can handle the application in question. For instance, various domains may return scores of LOW, MEDIUM, or HIGH, indicating the likelihood that they can handle the particular application. Entity resolution component 378 may return application/component names or titles for the request, which may be based on relevance scores that estimate a confidence that a particular application/component may be best used for the request. As an illustrative example, if the utterance is, "Call 'Contact 1'," NLU component 360 may determine, using entity resolution component 378, which domain(s), and thus application(s)/functionality or functionalities, can likely handle this request, and may select the domain and/or application/functionality having the highest confidence score as being the domain and/or application/functionality able to handle the request. NLU component 360 may further include a slot filler component 376 that can apply rules or other instructions to standardize labels or tokens from previous stages into an intent/slot representation. The precise transformation may depend on the domain. For example, a communications domain may include a text mention of "<Entity Name> home," and use the text mentioned to resolve the target's name (e.g., "Contact 1").

Functionalities component 362 may, for example, correspond to various action specific systems or servers, sometimes referred to as "skills," capable of processing various task specific actions. Functionalities component 362 may further correspond to first party applications and/or third party applications capable of performing various tasks or actions. For example, based on the context of the audio received from electronic device 100*a*, speech-processing system 350 may use a certain functionality to generate a response, or to obtain response information, which in turn may be communicated back to electronic device 100*a*. For instance, an utterance may ask to communicate with another individual (and that individual may be associated with a user account represented by an entity name), and therefore functionalities component 362 may access communications system 320 (or in some embodiments, third party messaging applications) to obtain contact information relating to user accounts and devices associated with or belonging to the user account associated with electronic device 100*a*. Functionalities component 362 may also include processor(s) 352, storage/memory 354, and communications circuitry 356.

In some embodiments, an application within functionalities component 362 may be written in any one of various computer languages, such as JavaScript and Java. Various applications may include an intent schema file and a sample utterances file, such as for example, IntentSchema.json including the JSON defining the intents of a particular application, and a SampleUtterances.txt including plain text sample utterances for the particular application. Applications may also include application specific code, such as a JavaScript or Java file, common library code, and various other JavaScript or Java components.

TTS component 364 may employ various text-to-speech techniques. However, techniques for converting text into speech are well known in the art and need not be described in further detail herein, any suitable computer implemented text to speech technique may be used to convert the output text message into audio signal(s) for playback to the user, such as SOFTSOUND speech processing technologies available from the Autonomy Corporation, which is headquartered in Cambridge, England, United Kingdom. TTS component 364 may also include processor(s) 352, storage/memory 354, and communications circuitry 356.

User accounts component 368 may store one or more user profiles corresponding to users having a registered account on computing system 300. For example, a parent may have a registered account on computing system 300, and each of the parent's children may have their own user profile registered under the parent's registered account. In some embodiments, each user account on accounts component 368 may be associated with a particular account identifier, which may itself be associated with a device identifier. When a request is received by computing system 300, a device identifier may indicate the device that the request was received from. The device identifier may then be mapped to an account identifier, which may indicate an account that the requesting device is registered to. In some embodiments, accounts component 368 may store voice biometric data representing voice biometric information for a specific user account. For example, acoustic features of a particular individual's voice may be stored for that individual's user account by accounts component 368. Other information, settings, and/or preferences for each user profile may be stored within a user profile database. In some embodiments, user accounts component 368 may store a voice signal, such as voice biometric information, for a specific user profile. This may allow speaker identification techniques to be used to match a voice-to-voice biometric data associated with a specific user profile. In some embodiments, user accounts component 368 may store a device identifier associated with a particular device, a communications identifier associated with a particular user account and/or group account, any other suitable information, or any combination thereof. In some embodiments, user accounts component 368 may store a telephone number assigned to a particular user profile. User accounts component may also include processor(s) 352, storage/memory 354, and communications circuitry 356.

Additionally, in some embodiments, user accounts component 368 may store contacts associated with a particular user account and/or user profile. Further, in some embodiments, contacts stored in user accounts component may include telephone numbers (i.e., public switched telephone network ("PSTN" contacts), usernames and other information associated with third party messaging networks, and internal user accounts associated with first party messaging networks. Further still, in some embodiments, user accounts component 368 may store devices belonging to a particular user account and/or user profile.

In some embodiments, such contacts and devices may be assigned an entity name. An entity name is any data, which may be represented in text data, audio data, or any other form, that may be used to indicate a particular device, contact, or combination thereof that may be used to identify a particular entity (i.e., contact, device, and/or group). For instance, a contact having the name "Bob Kitchen" may be assigned the entity names "Kitchen," "Kitchen, Bob," or "Bob Kitchen," among others. Similarly, in some embodiments, a device located in one's kitchen may be assigned the entity names "Kitchen," "Kitchen Echo," or "Kitchen Echo Show," among other entity names.

In some embodiments, user accounts component 368 may store entity names that were assigned by a user to represent any nicknamed device that the user sees fit. For instance, a device located in the bedroom of a family member named "Aaron" may receive the entity name "Aaron," "Aaron's Room," "Aaron's Echo," "Aaron's Echo Show," "Aaron's Echo Dot," "Superstar," or any other entity name assigned by a user to represent the device.

In some embodiments, user accounts component 368 may store entity names that were assigned to represent any group of contacts and/or devices. For instance, a user may collectively assign PSTN contacts (i.e., telephone contacts) of his or her family members the entity name "Home," "Family," or any other entity name. As another example, a user may collectively assign devices belonging to his or her user account (each of which belonging to himself/herself and/or a member of his/her family) the entity name "Home," "Family," or any other entity name. As another example, user accounts component 368 may store a combination of PSTN contacts, devices, and first party messaging contacts collectively as one entity name.

Persons of ordinary skill in the art will recognize that although each of ASR component 358, NLU component 360, functionalities component 362, TTS component 364, and user accounts component 368 may each include instances of processor(s) 352, storage/memory 354, and communications circuitry 356, and those instances of processor(s) 352, storage/memory 354, and communications circuitry 356 within each of ASR component 358, NLU component 360, functionalities component 362, TTS component 364, and user accounts component 368 may differ. For example, the structure, functionality, and style of processor(s) 352 within ASR component 358 may be substantially similar to the structure, functionality, and style of processor(s) 352 within NLU component 360, however the actual processor(s) 352 need not be the same entity.

Computing system 300, in a non-limiting embodiment, may also include a speech activity detection system. A speech activity detection system may correspond to any device(s) or system(s) capable of performing speech activity detection techniques to received audio data in order to determine whether or not that audio data represents speech. The speech activity detection system may be configured for use in many different VAD applications including, but not limited to, speech coding, speech enhancement, speech recognition. For example, similarly to speech recognition functionality employed by ASR component 358, a speech activity detection system may determine whether a given audio signal represents speech or non-speech. In some embodiments, a speech activity detection system may employ various techniques to recognize speech with audio data including, but not limited to, spectral reduction techniques, frame dropping techniques, feature extraction techniques, and/or noise estimation techniques. Persons of ordinary skill in the art will recognize that, in some embodiments, the speech activity detection system may be included within electronic device 100a, and/or may be included within one or more additional communications system, and the inclusion of speech activity detection system within computing system 300 is merely exemplary.

Generally speaking, the problem of identifying speech within audio data becomes more difficult the noisier the input audio signal is. Therefore, subtracting the noise from the input audio signal may provide a better sense of the overall non-noise audio signal, which may then be analyzed. In some embodiments, extracting the non-noise portion of the input audio signal may be broken down into functional processes: feature extraction, classification of the input signal, and smoothing. Feature extraction, for example, looks at the input audio signal and attempts to determine portions of the input audio signal representative of known speech. This process, for instance, may function substantially similarly to keyword spotting technology, as described in greater detail above. Classification processing may correspond to a rule-based process for assigning portions of the input audio signal as being one of speech or silence. For instance, an audio input signal may be classified at various discrete intervals as being associated with speech, or silence, depending on an intensity level of the audio signal at each discrete temporal interval. If the audio input signal is greater than a predefined threshold value defining a difference between noise and non-noise, then that audio input signal may be classified as being associated with not being silence. In some embodiments, a discrete Fourier Transform ("DFT") or Fast Fourier Transform ("FFT") may be performed to the audio data. Based on a known and/or determined signal to noise ratio ("SNR"), a classification may be made as to whether or not each discrete speech coefficient corresponds to speech or non-speech. Smoothing, in some embodiments, may correspond to a process for improving/enhancing the true (e.g., non-noise) audio signal against the noise. Persons of ordinary skill in the art will recognize that the aforementioned description of a speech activity detection system is merely exemplary, and any suitable process may be employed to determine whether audio data represents speech or non-speech.

Upon receipt of audio data representing sounds, the speech activity detection system, or any other suitable component or component of computing system 300, may segment the audio data into overlapping audio frame. For example, the audio frames may have a temporal length of a few milliseconds, however persons of ordinary skill in the art will recognize that any suitable temporal length may be used. A spectral representation (e.g., an amount of energy) of the audio data associated with each of the overlapping audio frames may then be determined. In some embodiments, a FFT may be performed on the overlapping audio frames.

In some embodiments, an initial choice for a background noise threshold may be determined based on energy values previously determined. For instance, a mean energy may be used, where the mean energy is determined using the energies of each audio frame. Using the mean energy as an initial threshold may allow a reasonable classification technique in the temporal domain to be employed, where any frame having an energy greater than the mean energy would correspond to a frame include speech, and any frame having an energy less than or equal to the main energy would correspond to non-speech. In the frequency domain, a slightly different classification technique may be employed, where various frequency bands are selected, and the energy of each audio frame is binned into one of the frequency bands. A given audio frame may be said to correspond to speech if the lowest frequency band is active and two out of the remaining frequency bands are also active. However, as mentioned previously, persons of ordinary skill in the art will recognize that the aforementioned speech analysis techniques are merely exemplary, and any suitable technique, or combination of techniques, may be employed.

Computing system 300, in a non-limiting embodiment, may also include a presence tracking system. The presence tracking system may be configured to determine human presence proximate to an electronic device, such as electronic device 100a. In some embodiments, the presence tracking system may receive image data from electronic device 100a at various times, and based on that image data, determine whether the an individual, or a portion of an individual, is located with view of camera(s) 314. However, in other embodiments, the presence tracking system may receive presence information from electronic device 100a, and may store this presence information and/or provide the presence information to one or more additional systems or devices. For example, electronic device 100a may employ various image recognition techniques, such as focus sweeps, motion vectors, edge detection, flash exposure, idle image comparisons, and/or skin tone identification, to attempt to identify whether camera(s) 314 includes a portion of a human, such as a human body part (e.g., face, eyes, mouth, torso, etc.). If so, this may indicate that an individual is located nearby electronic device 100a. This information, referred to generally as "presence information," may then be sent to the presence tracking system. In this way, the presence tracking system may continually track and monitor whether any individuals are located proximate to electronic device 100a.

However, persons of ordinary skill in the art will recognize that additional techniques may be employed by electronic device 100a (as well as, or alternatively, one or more additional devices), in order to determine whether presence is detected for electronic device 100a. For example, recent activity with electronic device 100a may be used to indicate that an individual is nearby electronic device 100a. In this particular scenario, an individual that is currently, or has recently been, interacting with electronic device 100a may indicate that that individual is still located substantially near electronic device 100a. As another example, IR emitters/sensors may be employed to determine a distance away from electronic device 100 that an individual currently is. As still yet another example, received signal strength indication ("RSSI") levels may be employed to determine an approximate signal strength between a mobile device and electronic device 100a. Using the RSSI levels, presence information indicating presence, or an absence of presence, for electronic device 100a, may be determined. In some embodiments, presence data indicating presence information may be provided to computing system 300, such as to presence tracking system 324.

Speaker identification system 370, in some embodiments, may correspond to any suitable device/system capable of identifying a particular person's voice from an audio signal. Speaker identification system 370 may determine whether a current voice being used to speak matches known voice biometric data associated with a particular individual's voice. In some embodiments, voice biometric data may be stored within user accounts component 368 for various individuals having a user profile stored thereby. For example, individual 2 may have a user account on computing system 300 (e.g., stored within user accounts component 368), which may be associated with electronic device 100a. Stored within the user account may be voice biometric data associated with a voice of individual 2. Therefore, when an utterance, such as utterance 4, is detected by electronic device 100a, and subsequently when audio data representing that utterance is received by computing system 300, speaker identification system 326 may determine whether the voice used to speak utterance 4 matches to at least a predefined confidence threshold the stored voice biometric information associated with individual 2 stored by their user account. If so, then this may indicate that individual 2 is the likely speaker of utterance 4.

In some embodiments, speaker identification component 370 may receive audio data representing an utterance, or a copy of the audio data, at a substantially same time as ASR component 358. The audio data may be divided into audio frames representing time intervals, with which a number of values or features representing qualities of the audio data may be determined, along with a set of those values (e.g., feature vectors or audio feature vectors) representing features/qualities of the audio data for each audio frame. For example, each audio frame may include 25 ms of audio, and the frames may start at 10 ms intervals. This may result in a sliding window where adjacent audio frames include 15 ms of overlapping audio. Persons of ordinary skill in the art will recognize that many different acoustic features may be determined, and each feature may be representative of a particular quality of the audio data. Some exemplary approaches that may be used to process the received audio data may include, but art not limited to, mel-frequency cepstral coefficients ("MFCCs"), perceptual linear predictive ("PLP") techniques, neural network feature vector techniques, linear discriminant analysis, and semi-tied covariance matrices. Speaker identification component 370 may also include a scoring component that determines respective confidence scores indicating how likely it is that an input utterance was spoken by a particular user.

When audio data is received by computing system 300, ASR component 358, speaker identification component 370, and/or any other suitable component of speech-processing system 350, may perform windowing functions to the audio data to generate framed audio data. The size of each audio frame may depend on a particular configuration of speech-processing system 350, and persons of ordinary skill in the art will recognize that any audio frame size may be used. For example, as mentioned previously, each audio frame may include 25 milliseconds of audio data, and may overlap with 10 milliseconds of a next audio frame, resulting in a sliding window. Performing a windowing function may include multiplying a time record by a finite-length window with an amplitude that varies smoothly and gradually toward zero at its edges. By performing windowing, endpoints of the waveforms of respective audio frames of audio data meet, resulting in a continuous waveform without sharp transitions. A fast Fourier transform ("FFT") may be performed to convert the waveforms in each audio frame of the framed audio data from its original domain (e.g., time) to a representation in a frequency domain (thereby creating frequency domain framed audio data). Audio processing techniques other than or in addition to FFT may be used to transform audio data (e.g., waveforms) into data that can be processed as needed.

In some embodiments, user recognition feature extraction may be performed on the frequency domain framed audio data. User recognition feature extraction may include performing frame level feature extraction and/or utterance level feature extraction. The frame level feature extraction may determine which frame of a universal background model ("UBM") the frame corresponds to. The UBM may be a Gaussian mixture model, a deep neural network, etc. The utterance level feature extraction may analyze aligned speech frames to derive feature vectors of fixed length (i.e., the user recognition feature/vector data). The feature extraction may continue until voice activity is no longer detected in the input audio data, at which point an endpoint of the speech may be identified and speech processing may end. Feature extraction may, in some embodiments, be performed on all the audio data received from the electronic device 100a. Alternatively, feature extraction may only be performed on audio data including speech. Feature extraction and user recognition feature extraction may include determining values (i.e., features) representing qualities of the frequency domain framed audio data, along with quantitating those features into values (i.e., acoustic feature vectors or audio feature vectors). Feature extraction may determine automatic speech recognition feature/vector data, which may assist with speech recognition processing for ASR component 358, and user recognition feature extraction may determine user recognition feature/vector data, which may assist with speaker identification/user recognition for speaker identification component 370. The feature/vector data and the user recognition feature/vector data may include the same features/vectors, different features/vectors, or may include some overlapping features/vectors. A number of approaches may be used to extract features/vectors from the frequency domain framed audio data, such as MFCCs, PLP techniques, neural network feature vector techniques, linear discriminant analysis, semi-tied covariance matrices, and persons of ordinary skill in the art will recognize that any other suitable approach may be employed.

Speaker identification component 370 may perform speaker identification using various data including user recognition features/vector data, and training data that may correspond to sample audio data corresponding to known users associated with a particular device (e.g., electronic device 100a). Speaker identification component 370 may generate confidence scores indicating a likelihood that a particular utterance was spoken by one of the users associated with a particular device, and may determine whether any of these confidence scores is greater than a predefined confidence score threshold. If so, then that may indicate a likelihood that a certain user is the speaker of the utterance. If two or more confidence scores are determined to be in excess of the confidence score threshold, then speaker identification component 370 may select the user having the greater confidence score, or may prompt the device to obtain additional information to resolve the speaker's identity.

In some embodiment, training data may be obtained and stored by user accounts component 368. The training data may be stored as waveforms and/or corresponding features/vectors, and may correspond to data from various audio samples, each audio sample associated with a known user and/or user identity. For example, each user known to the component may be associated with some set of training data for the known user. Speaker identification component 370 may then use the training data to compare against incoming audio data (represented by user recognition feature/vector data) to determine an identity of a user speaking an utterance. The training data may be associated with multiple users of multiple devices and therefore may be associated with both a user that spoke the respective utterance, as well as electronic device 100a, which provided the audio data representing the spoken utterance.

The training data for a particular user may include a feature vector of the same size as a vector of the user recognition feature/vector data. Thus, for example, if a feature vector is of size F, the training data may also be a feature vector of size F. To create such a training data feature vector, during a training period computing system 300 may either prompt a user to speak sample audio data or may identify sample audio data known to have been spoken by a particular user. The component may then process the sample audio data to create sample training data (e.g., a feature vector of size F). The training data may then be stored by user accounts component 368 and saved for use during runtime user verification processing.

In some embodiments, speaker identification processing may further include various additional techniques to determine a speaker of an utterance. For example, device beaconing may indicate a likelihood that a particular individual's device is located proximate to electronic device 100a. In this particular scenario, if an individual's device is determined to be substantially close to electronic device 100a at a time when the wakeword is uttered, then this may indicate that the wakeword was likely spoken by that individual. As another example, historical rules may be employed to determine a speaker of an utterance. For example, one particular individual may typically interact with electronic device 100a, and therefore it may be more likely that when a wakeword is detected by electronic device 100a, that wakeword is more likely than not spoken by that particular individual. Still further, certain individuals may be interact with electronic device 100a during certain times, or to perform certain functions. For example, a particular individual may typically ask for a weather forecast using electronic device 100a during a particular time frame (e.g., between 8 and 9 o'clock). In this particular scenario, if the wakeword is determined to have been uttered during that time frame, then this may indicate that there is a high likelihood that a speaker of the wakeword (and the corresponding utterance) is that individual. As another example, if a particular individual has just performed a specific function, such as sending a message to another individual, then if the wakeword is detected by electronic device 100a temporally after, and within a certain amount of time of, the specific function, then this may indicate that that individual likely spoke the corresponding utterance. Persons of ordinary skill in the art will recognize that various additional techniques may be employed to determine a speaker of an utterance, and the aforementioned are merely exemplary. Speaker identification component 370 may also include processor(s) 352, storage/memory 354, and communications circuitry 356.

Computing system 300 may also include, in a non-limiting embodiment, a communications system 320, which may be configured to facilitate communications between two or more electronic devices. For example, communications system 320 may be capable of facilitating a communications session between electronic device 100a and at least electronic device 100b of FIG. 1. Upon speech-processing system 350 determining that an intent of an utterance is for a communications session to be established with another device, computing device 300 may access communications system 320 to facilitate the communications session between the initiating device and the receiving device. For example, communications system 320 may employ VoIP functionality to facilitate audio, video, and/or text data communications between the initiating device and the recipient device.

Communications system 320, in one embodiment, may include a communications routing component 326. Communications routing component 326 may employ VoIP functionality to facilitate audio, video, and/or text data communications between the initiating device and the recipient device. In some embodiments, communications routing component 326 may allow a communications session to be established between an initiating device and a recipient device using one or more VoIP protocols including, but not limited to SIP, RTP, RTCP, SRTP, and SDP. In one illustrative embodiment, a SIP signaling command may be provided to communications routing component 326 for communicating with the recipient device. In particular, PJSIP functionality adds a new "user-to-user" header that indicates the device pair for the communications session. As an illustrative example, communications routing component 326 may route communications to a device's communications identifier in response to receiving an instruction to establish a communications session between one communications identifier and another.

In one embodiment, communications routing component 326 may include any suitable rules and/or prioritization schemes for organizing messages received for one or more user accounts and/or group accounts. For example, rules that cause messages having similar sender information to be grouped together may be included within communications routing component 326. In some embodiments, communications routing component 326 may include one or more rules to prioritize messages for playback. Such rules may include, but are not limited to, playback rules based on speaker identification, sender information, urgency of a message, vocal inflection, temporal aspects of the message, and/or content of the message. Communications routing component 326 may also include a message database, in one embodiment, capable of storing messages, or any other type of communication (e.g., telephone calls, text messages, emails, etc.). The message database may store each message that has been received with a corresponding user account or group account with which that message is directed to. Communications routing component 326 may also include processor(s) 352, storage/memory 354, and communications circuitry 356.

In one embodiment, communications system 320 may include communications account component 322, which may store one or more group accounts corresponding to one or more shared devices. Communications account component 322 may include a communications account database that stores communications identifiers for each group account and/or user account that is/are capable of communicating using communications system 320. For instance, a group account associated with one communications identifier may communicate with another group account associated with another communications identifier across a communications network facilitated by communications system 320.

In one embodiment, each communications account may be stored as being associated with account identifiers, linking accounts for speech-processing system 350 and communications system 320. For example, a shared device, such as shared voice activated electronic device 100a, may have its own group account stored on communications accounts component 322. The group account may be associated with the shared device, and may also be linked to one or more individual's user accounts. For example, shared electronic device 100a may be associated with a first group account corresponding to a first grouping of individuals (e.g., a family). One or more user accounts may also be associated with the first group account (e.g., individual members of the family), corresponding to individuals that may be capable of interacting with shared electronic device 100a. Information, settings, and/or preferences, for example, for each user account may be stored within a user account database. In some embodiments, communications accounts component 322 and user accounts component 368 may communicate with one another via network 330 to provide one another with account information associated with certain devices and communications accounts. For example, user accounts component 368 may store voice biometric data for a particular user account, which may then be provided to communications accounts component 322 to determine a communications identifier and/or other communications information associated with that user account so as to allow a device associated with the user account to communicate with one or more additional devices. As another example, user accounts component 368 may store a device identifier for each device associated with a particular user account so that when an intent to communicate with a contact is received, a list of device identifiers corresponding to devices associated with the user account may be accessed as potential entities that may be entered into an "Entity Name" slot to process the intent. Communications account component 322 may also include processor(s) 352, storage/memory 354, and communications circuitry 356.

Communications system 320 may, in some embodiments, include a contact services component 328. Contact services component 328 may store contact lists, contact information, and the like, associated with one or more communications identifiers. For example, if electronic device 100a is registered to an account identifier associated with electronic device 100a, and in particular to individual 2 who is a registered user of electronic device 100a, then a contact list associated with individual 2 may be accessible from contact services component 328 based on a communications identifier associated with the account identifier. In some embodiments, two or more communications identifiers may be linked together such that their contact lists may both be used to populate another contact list, such as a group account's contact list. For example, if two user accounts, corresponding to two separate users, are both associated with a same group account, then contact lists for each of the two user accounts may form the group account's contact list, which may then be associated with the account identifier. Communications system 320 may, as an illustrative example, store contact information associated with each contact entry of a communications identifier's corresponding contact list. For example, a contact list associated with a particular communications identifier may indicate contact identifiers for each contact of that contact list. For each contact identifier, contact information, such as, but not limited to, contact names, communications identifiers, device identifiers (indicating devices registered to the contact's user account(s)), additional contacts, group accounts, telephone numbers, location information, presence information, and the like, may be stored within storage/memory 354 of contact services component 328. Contact services component 328 may also include processor(s) 352, storage/memory 354, and communications circuitry 356.

Communications system 320 may also, in one embodiment, include a preferences component. Preferences component 324 may, in one embodiment, store information associated indicating which group accounts have granted a requesting group account with permission to establish a communications session with that group account. For example, upon a new contact being added to contact management component 328, a prompt may be provided to an individual to determine whether communication session privileges are allowed for that contact such that the contact may be able to establish a communications session with the individual (or other individuals associated with the shared electronic device) without requiring the individual to "accept" or "approve" the communications session. In some embodiments, the permission may be automated such that individuals that have granted permission to certain group accounts will be automatically stored by preferences component 324. When a user requests for contacts to be displayed, preferences component 324 may be accessed to obtain a list of group accounts that have authorized a particular group account associated with the request. Preferences component 324 may then provide a supplemental list, or list metadata, that indicates which group accounts stored within the contacts list of the communications account component 322 for the requesting device have granted the permission to the requesting group account. Preferences component 324 may also include processor(s) 352, storage/memory 354, and communications circuitry 356.

Communications system 320 may also, in one embodiment, include entity resolution component 332. Contact resolution component 332 may be configured to resolve, or attempt to resolve, a particular entity from a contact list and/or a device list. In particular, entity resolution component 332 may be configured to resolve one contact from two or more contacts that have been identified by ER component 378 during entity resolution processing. When a user speaks an utterance, such as "Call '<Entity Name>'," "Message <Entity Name>," and the like, audio data representing the utterance may first be provided to ASR component 358. ASR component 358 may generate text data representing the audio data such that the utterance is parsed into token text strings, such as "call" and "<Entity Name>," as well as an N-best list of token hypotheses. For each hypothesis, a corresponding confidence score may be attached indicating how confident ASR component 358 is that a particular hypothesis is a particular spoken word. NLU component 360 may then identify an intent and slot of the utterance based on the text data. For example, NLU component 360 may identify the intent of the utterance "Call 'Contact 1'" as being a call intent, and may further determine that the call intent has an "Entity Name" slot associated with it. Continuing the aforementioned example, the slot may be determined to have a value "Contact 1." Thus, ER component 378 may attempt to resolve the information attributed to the slot—{Entity Name}: "Contact 1"—to a specific entity. In one embodiment, entity resolution component 332 may host its own entity resolution component, which may reside as part contact services component 328.

Communications system 320, in one embodiment, may include a contact database 338, which may be searched for contacts that are associated with the value attributed to the entity name slot. When a contact is added to an individual's contact list, that contact's information may be stored by contact database 338 and used by Contact services ER component 334 during entity resolution processing. For instance, ER component 378 may invoke Contact services ER component 334 for searching for contacts matching the text value. A contact list may be searched for the text value "Contact 1" to identify any contact entries from the contact list that substantially match the text value. In some embodiments, similar sounding words/names, double metaphones, and the like, as that of the text value may also be queried. For example, a contact named "Bob" may sound similar to a contact named "Rob," and therefore both "Bob" and "Rob" may be searched for within the contact list. As another example, a contact named "John" may also sound similar to another contact named "Jon," and therefore both "John" and "Jon" may be searched for within the contact list. The searching of the contact list within contact database 338 may result in a list of contact entries—an entry within the contact list associated with a particular contact name—as well as contact identifiers associated with those contact entries. Thus, ER component 378 may yield entity resolution results as contact identifiers likely corresponding to contact entries of the contact list whose contact name substantially matches the input text value attributed to the entity name slot.

Contact resolution component 332 may, in one embodiment, be responsible for obtaining contacts (e.g., contact identifiers) from contact services component 328 and devices (e.g., device identifiers) from user accounts component 368. Contact services component 328 may store information for each of the contacts and/or devices (e.g., communications identifiers, telephone numbers, group account information, etc.). If there is more than one contact and/or device identifier received by NLU component 360 (e.g., ER component 378 yields two or more contact identifiers and/or device identifiers), then disambiguation rules 336 of entity resolution component 332 may be invoked to process the entity names from the entity resolution results. The various disambiguation processes included by disambiguation rules 336 may include filtering out entity names based on properties associated with the corresponding entries, entity information (e.g., contact and/or device information) associated with the corresponding entity names, and/or any other suitable criteria. For example, entity entity names associated with contact and/or device entries that had a confidence score from ASR component 358 of being less than a particular threshold (e.g., MEDIUM or LOW confidence score), may be removed from consideration. Entity entity names that have previously been considered for entity resolution (e.g., part of a "skip list" signifying that the particular entity names be removed from consideration) may be ignored. Furthermore, entity entity names may be removed based on their communications information. For example, contact identifiers that are unassociated with communications identifiers of communications account component 322 may be removed from consideration. In one embodiment, device identifiers that are determined to be ignored (e.g., not to be resolved to be the entity that the communications request and/or entity name slot is to be associated with) may also be added to a skip list. Thus, generally speaking, the goal of entity resolution component 332 is to return a single object (e.g., a communications identifier, telephone number, email address, etc.) to a speechlet/command processor such that the communications intent (e.g., a call intent) may be facilitated.

In some embodiments, communications system 320 may further include an index database 334. Index database 334 may store contact information obtained from contact database 338 and/or device information obtained from user accounts component 368 in an indexed manner such that elastic searching, or any other type of searching, may be used to search for a particular entity. When an individual uploads information for a particular entity's entry, that information may be provided to contact database 338, index database 334, and/or user accounts 368. Index database 334 may parse the information into various categories capable of being searched using different search queries. For example, information associated with a first contact and/or device entry may include a first name, a last name, a group account, a telephone number, an email address, and the like. Index database 334 may parse the information into each respective element. Therefore, when a query is made (e.g., get_entity ("Bob")), each of the first name, last name, group account, telephone number, and email address may be searched for the value "Bob." Persons of ordinary skill in the art will recognize that any suitable indexing technique and query term may be employed by index database 334, and the aforementioned is merely exemplary.

As an illustrative example, a communications session between two devices is described below to illustrate how the communications session may be established. In one example embodiment, an individual (e.g., individual 2) may speak an utterance (e.g., "Alexa, drop-in on Chris") to his/her electronic device (e.g., electronic device 100*a*). In response to detecting the device's wakeword (e.g., "Alexa"), the electronic device may begin sending audio data representing the utterance to computing system 300, and in particular speech-processing system 350. Upon receipt, ASR component 350 may perform speech recognition processing, such as STT processing, to the audio data to generate text data representing the audio data. The text data may then be passed to NLU component 360 to determine intent data indicating an intent of the utterance. For example, NLU component 360 may include a listing of sample utterances to be used to disambiguate the spoken words and determine an action intended to occur for the utterance. In some embodiments, a calling speechlet component may be included within NLU component 360 that includes one or more sample utterance frameworks. If the format of the spoken utterance substantially matches one of these sample utterances, then that may indicate that an intent of the utterance was for a communications session to be initiated. For instance, one example sample utterance may be "{Wakeword}, {Intent: Call} {Entity name}." If the spoken utterance's text data substantially matches this sample utterance's framework, then NLU component 360 may determine that the intent of the utterance was to start a communications session with a contact or device of the user, and may also determine that the intended target of the communications session is "Chris" (e.g., {Intended Target Name}: Chris).

After determining that a communications session with an target named "Chris" is to be established, communications system 320 may access user accounts component 368 and contacts database 338 to determine an entity name (e.g., a device address, contact name, etc.) associated with the user account that closely match the name "Chris." In some embodiments, user accounts may return multiple entity names closely matching the target name, "Chris" (e.g., "Chris Adams," "Chris Bryant," "Chris Bryant's Echo," "Christian Combs," "Chris's Echo," etc.). Accordingly, communications system may generate a list of entity names and compare each entity name to the intended target's name to derive a confidence level for each entity name. In some embodiments, the confidence level may indicate that a confidence level for a given entity name is "HIGH," "MEDIUM," and/or "LOW." In other embodiments, the confidence level may be a numerical value given an entity name. Once a confidence level is derived for each entity name, communications system 320 ranks each entity name by order of highest confidence level to lowest confidence level. In some embodiments, once the ranking is complete, communications system selects the top-ranked entity name and establishes a communications session between the initiating device (e.g., device 100*a* of FIG. 1) and the device represented by the entity name, which is determined through this process to be the intended target device (e.g., device 100*b* of FIG. 1). In some embodiments, the selected entity name may be a contact that is associated with a single device. Accordingly, the intended target device is the single device that is associated with the contact. In other embodiments, the contact is associated with multiple devices. Accordingly, in some embodiments, communications system 320 generates data representing language requesting a selection between the contact's devices for electronic device to output, and in response to receiving audio data representing a selection, communications system 320 may determine that the selected device is the intended target device. In some embodiments, however, rather than requesting a selection, communications system 320 may perform various re-ranking and filtering processes and techniques to further determine the intended target device autonomously.

Several additional factors may determine whether to re-rank entity names such that the entity names are no longer solely selected based on confidence level. For instance, user accounts 368 may store instructions to place certain contacts and/or devices on higher priority than others. For instance, if an entity name representing a contact named "Mom" is stored in user accounts 368 as corresponding to an entity name representing a group named "Home," and the "Home" entity name is stored as having a high priority, communications system 320 may re-arrange a generated list of entity names such that Mom becomes a top-ranked entity name. In some embodiments, rather than re-ranking, communications system 320 may simply remove all other entity names from consideration, or may simply select the entity name "Mom."

As another illustrative example, communications system 320 may send a request to one or more devices represented by entity names on a generated list. The request may include instructions to send presence information or speech activity to communications system 320. Potential target devices having detected current or very recent presence or speech activity may then be prioritized over devices that have not detected current or recent presence or speech activity. Thus, as an illustrative example, an intended target may be named "Kitchen," and potential target device names may include "Kitchen Echo" and "Kitchen Echo Show." "Kitchen Echo" may represent a device located in the kitchen of a first home, while "Kitchen Echo Show" may represent a device located in the kitchen of a second home. If the Kitchen Echo Show has more recently detected a presence or speech activity, then communications system 320 may re-rank the entity names such that "Kitchen Echo Show" becomes the top-ranked entity name and a communications session may be established between the initiating device and the device represented by the entity name "Kitchen Echo Show."

In some embodiments, communications system 320 may establish a communications session between the initiating device and the intended target device using PSTN. As such, communications system may receive a telephone number from user accounts 368 and establish the communications session using the particular telephone number assigned to the contact. Persons of ordinary skill in the art will recognize that the systems and methods for establishing a communications system via PSTN and related networks are well known in the art and need not be discussed herein in greater detail.

In some embodiments, communications system 320 may establish a communications session between the initiating device and the intended target device using one or more VoIP protocols including, but not limited to SIP, RTP, RTCP, SRTP, and SDP. In one illustrative embodiment, a media system provides a SIP signaling command to communications system 320 for communicating with the media system of the intended target device. In particular, PJSIP functionality adds a new "user-to-user" head that indicates the device pair for the communications session. The recipient device receives a request to start the communications session with the initiating device, and checks to see whether or not that initiating device is authorized to establish communications sessions therewith. If not, then the recipient device's media system may generate and send an instruction to communications system 320 that causes the communications session to end. Typically this step would not occur as the initiating device may also check, prior to the recipient device receiving the request, to see if he/she is authorized to establish a communications session, however in some embodiments the check may be performed by both endpoints.

If the initiating device determines that the recipient device is authorized to establish communications session therewith, then the media system of the recipient device may send an accept call command to communications system 320, indicating that the communications session may begin. In response to receiving the accept call command, communications system 320 may send a 200 (OK) message to a SIP Proxy running on communications session 320 for facilitating the communications session. A 200 (OK) is a standard response that indicates a successful HTTP request. The SIP Proxy may act as an intermediary server/client for making requests for both the initiating device and the recipient device for routing communications to/from either device. After receiving the 200 (OK) message, the SIP Proxy may send another 200 (OK) message to the initiating device, which may acknowledges receipt using an ACK (e.g., an acknowledgement). In turn, a SIP Dialog may be established by communications system 320 for the communications session, and media systems of both the initiating device and the recipient device may connect to the SIP Dialog, and the two devices may now communicate with one another.

Furthermore, persons of ordinary skill in the art will recognize that speech activity detection system 322, presence information system 324, speaker identification system 326, and/or communications system 320 may be located external to computing system 300, and the inclusion of speech activity detection system 322, presence information system 324, speaker identification system 326, and communications system 320 within computing system 300 is merely illustrative.

Figure 4:
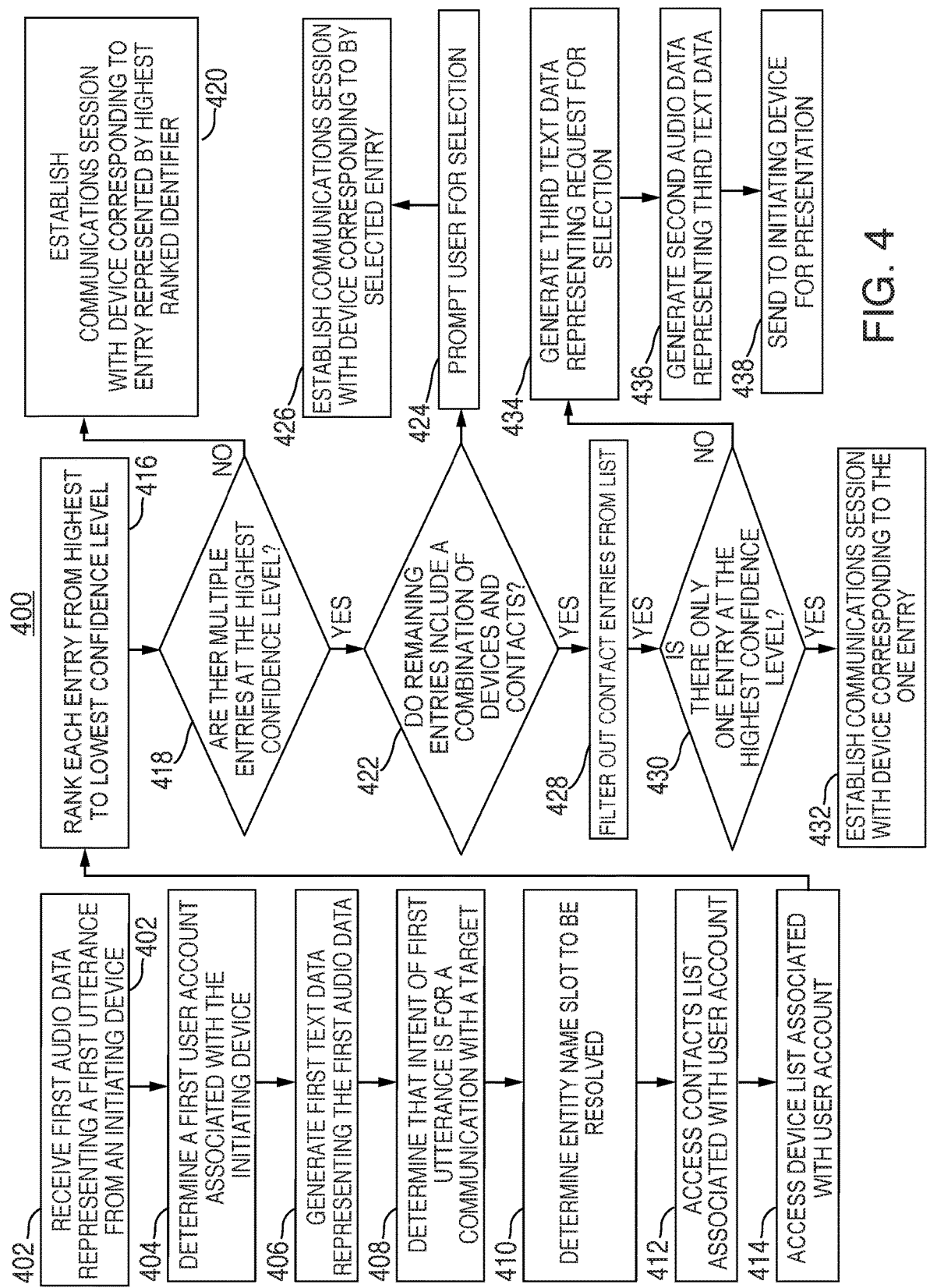
FIG. 4 is a process for establishing a communications session between an initiating device and a target device, in accordance with various embodiments.

FIG. 4 is a process for establishing a communications session between an initiating device and a target device, in accordance with various embodiments. Process 400 may begin with step 402. At step 402, first audio data from an electronic device may be received from an initiating device. The initiating device may be an electronic device, such as a voice-controlled electronic device. Then, at step 404, a user account associated with the initiating device may be determined. At step 406, first text data representing the first audio data may be generated using, for instance, ASR processing.

At step 408, NLU processing may be performed using the first text data to determine that an intent of the first utterance is to communicate with a target. In some embodiments, this may be performed by NLU component 360 by analyzing each component of the text data. For instance, NLU component 360 may receive text data representing the utterance "Alexa, call Kitchen." NLU component may then generate intent data by determining that "Alexa" may represent a wakeword, "call" may represent an intent function such that a communications-based domain may be utilized, and "Kitchen" may represent a target. Additionally, at step 410, further processing may be performed such that intent data may indicate that a communications session is to be established between the initiating device and a device represented by the entity name "Kitchen." Thus, at step 410, intent data may further indicate that the first text data includes second text data, specifically, that the second text data represents a unique description of the target (i.e., an entity name).

At step 412, a contacts list associated with the user account is generated. Each entry may represent either a different contact associated with the user account. At step 414, a confidence level for each entity name can be generated. A confidence level is a representation of how closely an entity name matches the second text data. For instance, the confidence level may be a numerical value, or an indication within a range of numerical values (e.g., "HIGH" for confidence levels between 100% and 67%, "MEDIUM" for confidence levels between 66% and 34%, and "LOW" for confidence levels between 33% and 0%). At step 416, each entity name is ranked from highest corresponding confidence level at the top of the rankings to lowest corresponding confidence level at the bottom of the rankings.

At step 418, it is determined whether there is a set of entity names at the highest confidence level. If there is not a set of entity names at the highest confidence level, then that means that there may be a single entity name at the highest confidence level. Accordingly, process 400 may proceed to step 420, at which point a communications session may be established between the initiating device and the target device represented by the highest ranked entity name. If, however, there is a set of entity names at the highest confidence level, then process 400 may proceed to step 422.

At step 422, it is determined whether that set of entity names includes entity names representing both devices and contacts. If it is determined that the set does not include a combination of entity names representing both devices and contacts, then that should mean that the set includes either all contacts, or all devices. Accordingly, process 400 would proceed to step 424, at which point additional steps not shown in FIG. 4 for the sake of simplicity in the figure are performed in order to prompt a user to select which specific contact (out of the set of contacts) or device (out of the set of devices) the user wishes to communicate with. Once the system receives the selection (which should, after ASR processing, be determined to be text data matching an entity name from the set), then process 400 would proceed to step 426, at which point, in response to receiving the selection, a communications session may be established with a device corresponding to the selected entity name.

If it is determined at step 422 that the set of entity names does in fact include both devices and contacts, then process 400 may proceed to step 428. At step 428, entity names representing contacts may be removed from the list. At that point, at step 430, it is determined whether there is now only one entity name with the highest confidence level. If there is only one entity name at the highest confidence level, then at step 432, a communications session may be established between the initiating device and the device represented by that entity name.

If, at step 430, it is determined that there are still multiple entity names at the highest confidence level, then process 400 may proceed to steps 434, 436, and 438 (additional steps may be involved, but are omitted from FIG. 4 for the sake of simplicity). At step 434, third text data may be generated. The third text data may represent a request for a selection between the entity names that remain at the highest confidence level after the filtering. Next, at step 436, second audio data representing the third text data may be generated. Finally, at step 438, the second audio data may be sent to the initiating device for presentation. In some embodiments, in response to receiving a selection, a communications session between the initiating device and a selected device may be established.

Figure 5:
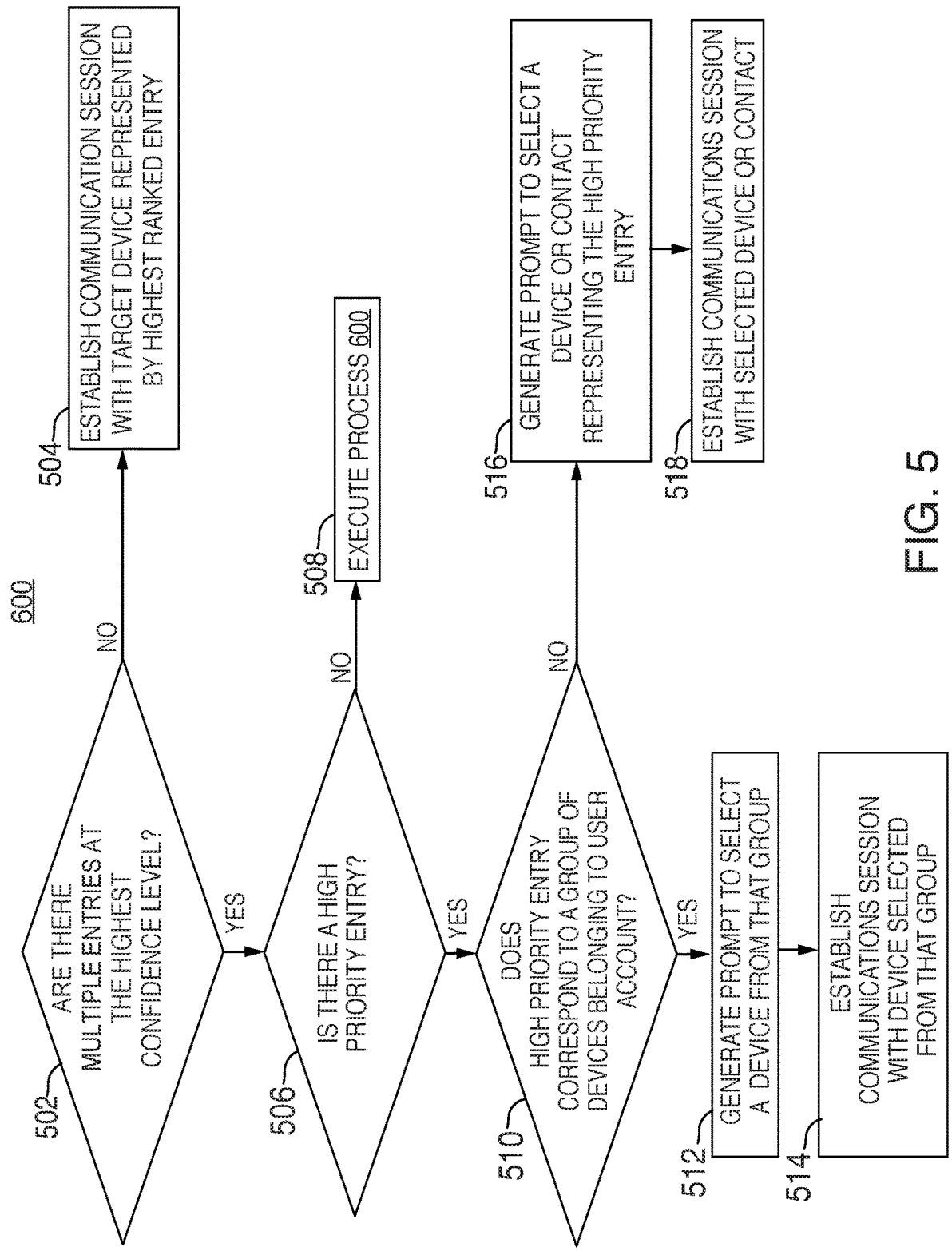
FIG. 5 is an illustrative diagram of a process for selecting an entity name from a list of entity names, in accordance with various embodiments.

FIG. 5 is an illustrative diagram of a process for selecting an entity name from a list of entity names, in accordance with various embodiments. In some embodiments, process 500 may begin at step 502. In some embodiments, step 502 may be substantially similar to step 418 of process 400, as shown in FIG. 4. Specifically, at step 502, after the entries are ranked in descending order from highest confidence level, it may be determined if there are multiple entries at the highest confidence level. In other words, at step 502, the system determines that there is a tie amongst entries that have the closest match to the intended target's name (e.g., the a value to fill the entity name slot determined at step 410 of process 400 as shown in FIG. 4). If there are not multiple such entries, then that should mean that there may be no tie, and a singular entity name has the highest rank (i.e., has the closest match to the intended target's name). As such, process 500 may proceed to step 504, at which point the contact/device represented by the highest ranked entity name may designated as the intended target, and a communications session may be established between the initiating device and a device represented by that intended target (which, as noted above, may be referred to herein as an "intended target device").

In some embodiments, however, there may indeed be multiple entity names at the highest confidence level. Accordingly, process 500 may proceed to step 506, which determines whether there is an entry that has been designated as having a high priority. For instance, a high priority entity name may be called "HOME." If there is not a high priority entry within the list of entries, then process 500 may proceed to step 508, which will be illustrated in greater detail in FIG. 6 as process 600. If at step 506, it is determined that there is a high priority entry within the list, then process 500 may proceed to step 510. At step 510, the system determines whether the high priority entry represents a group of devices belonging to the user account. If the system determines that the high priority entry does in fact represent such a "high priority" group, then at step 512, the system generates a prompt requesting that a user select a device from the high priority group. In response to receiving the selection at step 514, a communications session may be established between the initiating device and the selected device from the high priority group.

If, at step 510, the system determines that the high priority entry does not represent a group of devices belonging to the user account, then the high priority entry may represent a specific contact or a specific device. As such, process 500 may proceed to step 516, at which point the system may generate a prompt requesting that a user make a selection between the contact and device. Upon receiving the selection, at step 516, the system may then establish a communications session with the device (or, alternatively, a device corresponding to the contact) represented by the selected entry at step 518.

In alternative embodiments of step 506, there may be multiple entries having been designated as a high priority entry. For instance, there may be a group of devices associated with the user account named "WORK," "WORK 2," or the like, all of which may be high priority entries. As such, in some embodiments, a prompt may be generated that represents language requesting a selection between high priority entries. Additionally, in some embodiments, such entries may relate to a group of contacts associated with the user account. For example, an entry within a group of entries at the highest confidence level be associated with the entity name "CRUISE." In some embodiments of this example, the group "CRUISE" may represent a group of telephone contacts (or alternatively, a group of contacts associated with the user account via various communications functionalities, including third party skills and other applications). Further still, in some embodiments, a high priority entry may represent any combination thereof. For instance, in some embodiments, the group "BEST BUDS" may be designated as a high priority entry, and thus may receive priority over all other entries. The contacts group "BEST BUDS" may include, for instance, a device, a user contact associated with a telephone number, a user contact associated with a functionality internal to systems such as system 300 of FIG. 3, and a user contact associated with a third party functionality. As such, upon determining that "BEST BUDS" has a high confidence level with respect to the intended target entity, alternative steps in alternative processes may involve generating a prompt for an initiating device to output, in which the prompt represents a request for a user to make a selection within the "BEST BUDS" group.

Figure 6:
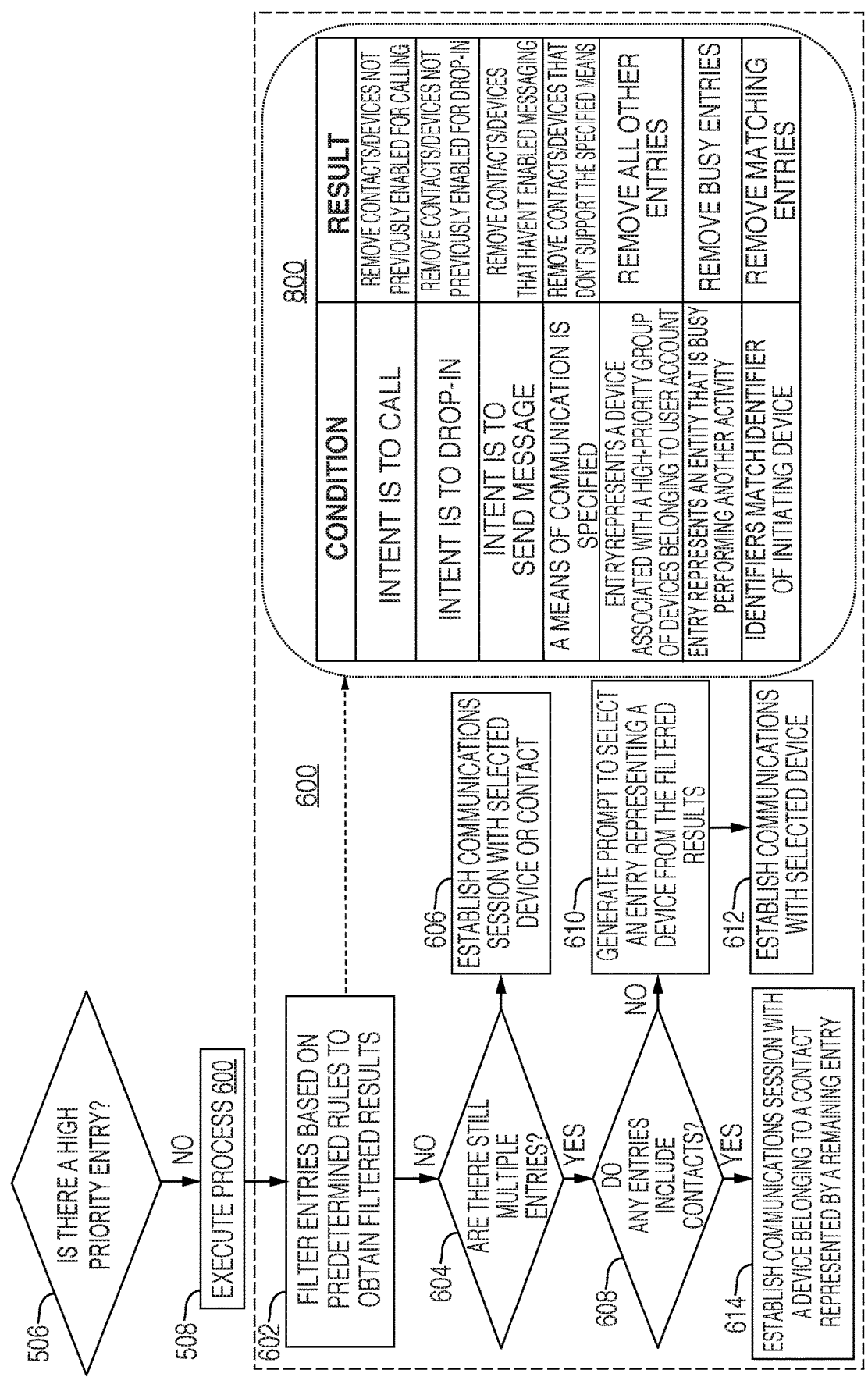
FIG. 6 is an illustrative diagram of a process for selecting an entity name from a group of entity names at the highest confidence level, in accordance with various embodiments.

FIG. 6 is an illustrative diagram for a process for selecting an entry from a set of entries at the highest confidence level, in accordance with various embodiments. As stated above, process 600 may be a continuation from step 508 of process 500. As such, if it is determined that there is not a high priority entry within the list, process 600 may follow at step 602. At step 602, the entries are filtered to selectively determine a target entity. This filtering of entries may be performed according to various rules and conditions. For instance, table 800, which will be discussed in further detail in FIG. 8, provides an exemplary, non-limiting, non-exhaustive list of rules and conditions that may be utilized to filter the entries to obtain filtered results. At step 604, the system can determine whether there are still multiple entries within the set of entries having the highest confidence level. If there are no longer multiple entries, then at step 606, a communications session may be established between the initiating device and the device or contact represented by the remaining entry.

In some embodiments, multiple entries may still remain after various filtering processes and/or steps are performed. If multiple entries do remain, then at step 608, the system determines whether any of the remaining entries represent contacts. If the entries do not represent contacts, the process moves to step 610, which causes a prompt to be generated to the user to select an entry representing a device from the filtered results. Then, in step 612, a communications session can be established with the selected device. If, after all of the filtering steps, an entry associated with an entity name that represents a contact still remains, then at step 614, the system selects a device belonging to the contact (i.e., registered to a user account associated with the contact) and establishes a communications session with that device.

Figure 7:
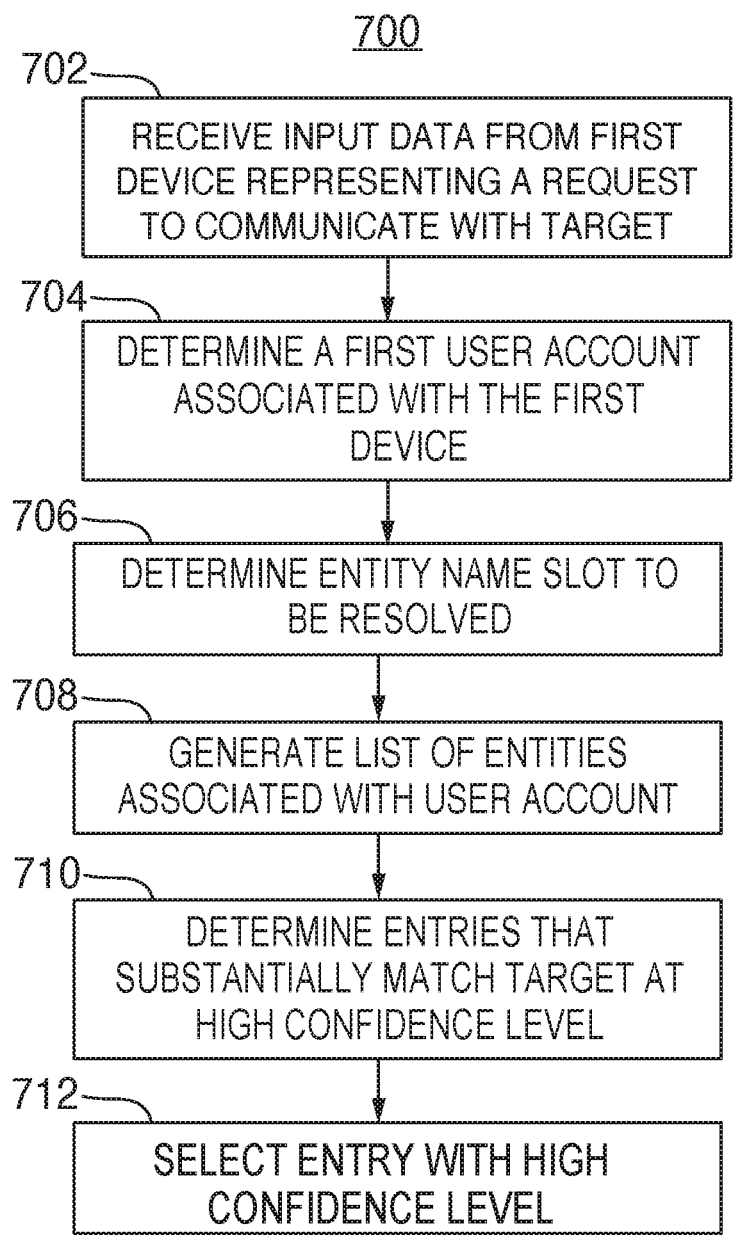
FIG. 7 is an illustrative diagram of a process for establishing a communications session between an initiating device and a target device, in accordance with various embodiments.

FIG. 7 is an illustrative diagram for a process for establishing a communications session between an initiating device and a target device, in accordance with various embodiments. In various embodiments, FIG. 7 discloses a considerably more simplified process than process 400, which is disclosed in FIG. 4. Process 700 may, in some embodiments, begin with step 702. However, similar to processes 400, 500, and 600, persons of ordinary skill in the art will understand that the steps of process 700 may be performed interchangeably in some embodiments.

At step 702, input data representing a request may be received from a first device. In some embodiments, the input data may be audio data representing an utterance that may be spoken by an individual. For instance, the first utterance may be utterances 4 and 5 of FIGS. 1 and 2, respectively. Such an utterance may include a wakeword, an intent, or any other spoken words that may be received by a microphone or other audio recording device of an electronic device. The input data itself may represent a request to communicate with a target.

At step 704, a first user account associated with the first device may be determined. When the first audio data is received, the audio data may include metadata or some other type of information that may identify the source of the audio data, such as an entity name of the initiating device. As such, in response to receiving the first audio data, a user account associated with the user device may be ascertained. For instance, a system may communicate with user accounts component 368 of FIG. 3 to receive data corresponding to the user account associated with the initiating device.

At step 706, an entity name slot may to be resolved may be determined. In other words, it may be determined that an intent of the first utterance is to communicate with a target entity. In some embodiments, a system may communicate with ASR component 358 to generate first text data representing the first audio data received from the initiating device. Then, the system may communicate with NLU component 360 to analyze the first text data. This analysis may be performed to determine intent data representing an intent of the input data. For instance, text data that states "Alexa, call Kitchen," may represent utterance 4 of FIG. 1. The text data may be analyzed by NLU component 360 to determine that utterance 4 means "{Wakeword}, {Intent: Call} {Target: "Kitchen"}." Thus, the intent may be to call a target, and a value corresponding to the entity name slot to be filled may include "Kitchen". In order to process the intent data, process 700 may then proceed to step 708.

At step 708, a list of entities associated with the user account may be generated and/or accessed. In some embodiments, step 708 may be performed by retrieving, for instance, one or more contacts stored in contacts database 328 and/or devices stored in user accounts component 368. In alternative embodiments, a list of contacts and a list of devices may be generated. Each contact and/or user device may be represented in user accounts component 368 as an entity name, which can be used as an entity name for the contact and/or a user device associated with the user account.

At step 710, entries from the entity list that substantially match the target entity name at corresponding confidence levels may be determined. This may be performed in a number of ways. In some embodiments, each entity name may be analyzed by communications system 320 to determine a value for use in resolving the entity name slot, by, for instance, determining which entity names substantially match the name of the target and to what degree, and that degree may be represented by a confidence level. As such, in some embodiments, this may be done by comparing each entity name against the name of the target to determine a confidence level for each entry. As noted above, a confidence level may be a representation of the extent to which an individual name matches the name of the target. In some embodiments, once confidence levels are determined for each entry, each entry may be ranked by order of the top-ranked entry having the highest confidence level of all of the entries, to the bottom-ranked entry having the lowest confidence level of all of the entries. In some embodiments, there may only be one top-ranked entry, and the top-ranked entry may be selected.

Finally, at step 712, an entry with a high confidence level may be selected. In some embodiments, there are multiple top-ranked entries having substantially equivalent confidence levels (e.g., two entries having a confidence level of 100%) or a confidence level within a substantially equivalent range fitting within a predefined threshold (e.g., two entity names having a "HIGH" confidence level). Thus, an ambiguity arises such that system has an essentially equivalent reason to select either entry. Thus, additional steps may be necessary to disambiguate the entries, such as by filtering out (i.e., removing) entries from consideration as possible values to be associated with an entity name slot based on certain criteria (e.g., by introducing certain rules and conditions to differentiate contacts, devices, and/or groups of contacts and devices represented by entity names, as well as their associated communications statuses). For instance, in some embodiments, it may be preferable to utilize certain types of communications channels and networks, such as by prioritizing internal communications networks over, for instance, communications over PSTN or third party communications networks. Thus, a communications system, such as communications system 320 may include software, or various other systems and methods for filtering out certain entries based on such criteria. As another example, it may be preferable to eliminate devices that are currently engaged in communications sessions. For instance, if an entry represents a "Home" group, then an individual may simply seek to speak with any available member of his or her home. Thus, a device that is currently in a communications session (or alternatively, is currently involved in some other process, intent, or activity), may be filtered out. Alternatively, it may be desirable to re-rank entries based on predetermined desirable criteria (e.g., based on entries that have a specified form of communication enabled, entries that are designated as high priority, etc.).

In some embodiments, after such filtering has been performed, there may be only one top-ranked entry remaining. As such, it may be determined that the top-ranked entry matches the value of the entry name slot at the highest confidence level, or is otherwise determined to be the best option of the entries on the list of entities for resolving the entity name slot. Accordingly, a device (or, alternatively a device associated with a contact) represented by the remaining top-ranked entry may be selected to initiate a communications session with the initiating device. In other embodiments, there may still be multiple top-ranked entries remaining. Thus, a system may generate data for the initiating device to output such that the initiating device presents an audio signal that includes language to a user requesting a choice of one entry from the remaining entries. In some embodiments, the audio signal may include references to the entries by the entity names representing those entries. Once the system receives the choice, then the system may select the chosen device or contact represented by the chosen entry to initiate a communications session with the initiating device.

In some embodiments, a contact may be selected to initiate a communications session with an initiating device. However, in some embodiments, a contact may be associated with multiple user devices. Thus, further disambiguation may be needed. As such, a system may generate data for the initiating device to output such that the initiating device presents an audio signal that includes language to a user requesting that the user select a device associated with the contact. In some embodiments, the contact may have a user account that has stored data representing instructions that all incoming communications be addressed to a designated device. Accordingly, the system may further select the designated device as a target device to initiate a communications session with the initiating device.

After the aforementioned filtering processes have been performed to determine a single entity to resolve the entity name slot, a communications session may be established between the initiating device and a target device represented by (or otherwise associated with) the selected entity name. As noted above, the communications session may be established via PSTN, internal communications networks stored in the system, third party communications networks associated with the user account and a user account associated with the target device, or some other means of communication.

FIG. 8 is an illustrative diagram of a table of conditions and their corresponding filtration results, in accordance with various embodiments. For instance, if a speech processing system determines that a condition 802a is that the user intent is to initiate a conventional call (e.g., a telephone call) with another user, the system may prioritize communications over a traditional PSTN. Accordingly, a corresponding filtration result 802b may be to remove all contacts and devices that have not enabled telephonic (i.e., PSTN) calling from a list of potential target entities. In other embodiments, a corresponding filtration result may be to remove all contacts and devices that have not enabled any form of calling feature at all.

In some embodiments, at condition 804a, a user intent may be to "drop-in" (i.e., initiate an instant communication with a contact or device that the user's account has been given permission to engage in instant communications) on a contact or device. Accordingly, a filtration result 804b may be to remove contacts and devices not previously enabled for "drop-in" access (e.g., a user account associated with an initiating device has not been given permission to engage in "drop-in" communications with the user account or device represented by the target entity name).

In some embodiments, a condition 806a may be to send a voice message to another contact or device. Accordingly, a filtration result 806b may be to remove all contacts that are not enabled to communicate with the user's initiating device through internal messaging systems. For instance, all contacts and devices that are only enabled to communicate with a user's initiating device through PSTN means, or through third party communications functionalities, may be removed from a list of potential target entities.

In some embodiments, a condition 808a may be that an intent to communicate includes an intent to communicate via a specified means of communication. For instance, a user may utter "Alexa, call Mom via {app}," where {app} is an internal functionality, a third party application, or some other means of communication. Thus, a result 808b may be that all entity names representing contacts and devices that have not enabled the specified means of communication may be removed from a list of entity names, leaving only contacts and devices that are capable of communicating through the specified means of communication.

In some embodiments, a condition 810a may be that an entry represents a device associated with a high-priority group of contacts or devices belonging to the user account associated with an initiating device. Accordingly, a filtration result 810b may be that all entries not associated with the high-priority group may be removed from the list of entities. For instance, if an intended target's name is "Alex," and there are two entity names named "Alex" that are associated with a user's "Home" group, then result 810 may be that all other entries may be removed from consideration and an initiating device may output and audio signal with language such as "Which 'Alex' from your Home would you like to speak with?"

In some embodiments, a condition 812a may be that an entry of the list of entities may represent a specific entity that is currently busy performing some other activity. For instance, a device represented by an entity name may be involved in another communications session, may be busy listening to music, may be providing procedural directions etc. Accordingly, at result 812b may be that an entity name representing such a busy device, as well as entity names representing other busy devices, may be removed from the list of entity names.

In some embodiments, a condition 814a may be that entity names representing entries within the group of entries having the highest confidence level may be an exact match with a username representing the initiating device. Clearly, an individual would be highly unlikely to be attempting to contact himself or herself using the same device that they are initiating the contact from. Thus, a filtration result 814b may be to remove entries represented by entity names that match the username from the list of entity names.

Persons of ordinary skill in the art will recognize that various sets and combinations of conditions and results may be utilized for the purposes of disambiguation in addition to the conditions and results shown in FIG. 8. Other examples involving conditions and results include removing contacts and/or devices that have not been active for a predetermined amount of time. As another example, a potential target device may include a camera. As such, the camera may be used to collect image data. Based on the image data, a lack of presence may be detected and/or determined. For instance, it may be determined that, based on an absence of data indicating that a human (or at least a part of a human body) is present in an image captured by the potential target device, such a potential target device is inactive, or otherwise unavailable. Accordingly, the entries associated with an entity name representing that potential device, as well as entity names representing other such potential target devices, may be removed from the list of entries. Further still in yet another example, processes for determining a target entity from a plurality of entity names may have previously been performed with respect to a particular name of an intended target. If previous prompts for selection under such circumstances have previously resulted in a particular selection of a specific entity name, then a result may be to immediately select that entity name from a list of entries. In yet another example, a condition may include determining, based on speaker identification 370, a particular speaker, or user, associated with a user account and/or associated with a user device. For instance, once a list of contacts and devices associated with a user device is accessed, a particular list of contacts and/or devices specifically associated with the speaker that was identified based on speaker identification 370 (i.e., the particular user accessing the user account at that time) may be determined, and contacts and/or not specifically associated with that speaker may be removed from consideration. In other embodiments, however, the system may simply re-rank entries from the list of contacts and/or devices such that contacts and/or devices that are specifically associated with that speaker are ranked relatively higher.

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A method comprising:
receiving, from an initiating device, first input audio data representing a first utterance;
identifying a first user account associated with the initiating device;
generating, using automatic speech recognition (ASR) processing, first text data representing the first input audio data;
generating, using natural language understanding (NLU) processing and the first text data, intent data indicating an intent to establish a synchronous communications session with a target, the synchronous communications session including an entity name slot to be resolved;
determining, using the first text data, a first text value associated with a portion of the first utterance corresponding to the target, the first text value to be used for resolving an entity for the entity name slot;
accessing a contact list associated with the first user account;
accessing a device list associated with the first user account;
determining that there is a first contact entry from the contact list that substantially matches the first text value at a first confidence level;
determining that there is a first group entry from the contact list that substantially matches the first text value at a second confidence level, the first group entry including a second contact entry from the contact list and a first device entry from the device list;
determining that there is a second device entry from the device list that substantially matches the first text value at a third confidence level;
ranking the first confidence level, the second confidence level, and the third confidence level from highest confidence level to lowest confidence level;
determining that the first confidence level is a top-ranked confidence level;
re-ranking, based on a predetermined condition, the first confidence level, the second confidence level, and the third confidence level such that the second confidence level becomes the top-ranked confidence level; and
selecting, based on re-ranking, the first group entry as a value to be associated with the entity name slot.

2. A method of claim 1, further comprising:
determining a first identifier associated with the first device entry;
accessing a prioritized entity list associated with the first user account, wherein the prioritized entity list represents a list of high priority contacts and devices; and
determining that the predetermined condition has been met by the first identifier being listed in the prioritized entity list.

3. A method of claim 1, further comprising:
determining a first identifier associated with the initiating device;
determining a second identifier associated with the first device entry;
determining that the first identifier is substantially identical to the second identifier; and
removing the first device entry from consideration as a possible value to be associated with the entity name slot.

4. A method of claim 1, further comprising:
determining a first identifier associated with the second contact entry and a second identifier associated with the first device entry;
generating output text data representing a request to make a selection between the first identifier and the second identifier;
generating, using text-to-speech processing, output audio data from the output text data;
sending the output audio data to the initiating device for presentation;
receiving, in response to the presentation, second input audio data representing a second utterance;

determining that the second input audio data represents a selection; and establishing, in response to the selection, a communications session between the initiating device and a target device associated with the first device entry.

5. A method comprising:

receiving, from a first device, first input data representing a first request to communicate with a target represented by an entity name, the first request including an entity name slot to be resolved, the first device being represented by a first identifier;

accessing contact data representing at least one contact associated with a first user account;

accessing device data representing a device associated with the first user account;

determining a first confidence value representing a likeness between the contact data and the entity name;

determining a second confidence value representing a correspondence between the device data and the entity name;

determining that the first confidence value and the second confidence value satisfy a condition;

processing the first confidence value with respect to the second confidence value;

determining that the first request corresponds to an intent to communicate with the target via a specified form of communication; and selecting, based at least in part on the processing, the satisfaction of the condition by the first confidence value and the second confidence value and the specified form of communication, the device data as corresponding to the target for communications.

6. A method of claim 5, further comprising:

determining that the second confidence value is a top-ranked confidence value and higher than the first confidence value;

re-ranking, based on a predetermined condition, the first confidence value and the second confidence value such that the first confidence value becomes the top-ranked confidence value; and selecting, based on the re-ranking, a first entry as a value to be associated with the entity name slot.

7. A method of claim 6, wherein the re-ranking comprises:

determining a first priority corresponding to the first entry;

determining a second priority corresponding to a second entry; and ranking, based on the first priority and the second priority, the first confidence value and the second confidence value such that the first confidence value becomes a top-ranked confidence value.

8. A method of claim 7, further comprising:

determining a third entry from a list that substantially matches the first entry at a third confidence value, wherein the third entry is represented by a second identifier;

ranking the first confidence value, the second confidence value, and the third confidence value;

determining that the second identifier is substantially identical to the first identifier; and removing the third entry from consideration as a possible value to be associated with the entity name slot.

9. A method of claim 5, further comprising:

determining that a potential value associated with the entity name slot lacks a capability to communicate via the specified form of communication; and removing the potential value from consideration to be associated with the entity name slot.

10. A method of claim 5, further comprising:

determining that a second entry is associated with a second device in a communications session; and removing the second entry from consideration to be associated with the entity name slot.

11. A method of claim 5, further comprising:

associating a third entry with a second device;

associating a fourth entry with a third device;

generating output data indicating a request to make a selection between the second device and the third device;

sending the output data to the first device for presentation;

receiving a selection; and establishing, in response to the selection, a communications session between the first device and the second device.

12. A system comprising:

communications circuitry;

memory; and at least one processor operable to:

receive, from a first device, first input data representing a first request to communicate with a target represented by an entity name, the first request including an entity name slot to be resolved, the first device being represented by a first identifier;

access a list of contacts and devices associated with a first user account;

determine a first entry from the list that substantially matches the entity name at a first confidence value;

determine a second entry from the list that substantially matches the entity name at a second confidence value;

determine that the first confidence value and the second confidence value satisfy a condition;

rank the first confidence value and the second confidence value;

determine that the first request corresponds to an intent to communicate with the target via a specified form of communication; and select, based at least in part on ranking and the satisfaction of the condition and the specified form of communication, the first entry as a value to be associated with the entity name slot corresponding to the target for communications.

13. A system of claim 12, wherein the at least one processor is further operable to:

determine, based on historical data, a previous selection of the first entry.

14. A system of claim 12, wherein the at least one processor is further operable to:

determine that the second confidence value is a top-ranked confidence value;

re-rank, based on a predetermined condition, the first confidence value and the second confidence value such that the first confidence value becomes the top-ranked confidence value; and selecting, based on re-ranking, the first entry as a value to be associated with the entity name slot.

15. A system of claim 14, wherein the at least one processor is further operable to:

determine a first priority corresponding to the first entry;

determine a second priority corresponding to the second entry; and rank, based on the first priority and the second priority, the first confidence value and the second confidence value such that the first confidence value becomes a top-ranked confidence value.

16. A system of claim 15, wherein the at least one processor is further operable to:
- determine a third entry from the list that substantially matches the entity name at a third confidence value, wherein the third entry is represented by a second identifier;
- rank the first confidence value, the second confidence value, and the third confidence value;
- determine that the second identifier is substantially identical to the first identifier; and
- remove the third entry from consideration as a possible value to be associated with the entity name slot.

17. A system of claim 12, wherein the at least one processor is further operable to:
- determine that a potential value lacks a capability to communicate via the specified form of communication; and
- remove the potential value from consideration be associated with the entity name slot.

18. A system of claim 12, wherein the at least one processor is further operable to:
- determine that the second entry is associated with a second device in a communications session; and
- remove the second entry from consideration to be associated with the entity name slot.

19. A system of claim 12, wherein the at least one processor is further operable to:
- associate a third entry with a second device;
- associate a fourth entry with a third device;
- generate output data indicating a request to make a selection between the second device and the third device;
- send the output data to the first device for presentation;
- receive a selection; and
- establish, in response to the selection, a communications session between the first device and the second device.

20. A method of claim 6, further comprising:
- determining, based on historical data, a previous selection of the first entry.

* * * * *